(12) United States Patent
Sayyarrodsari et al.

(10) Patent No.: US 11,327,473 B2
(45) Date of Patent: May 10, 2022

(54) DYNAMICALLY RECONFIGURABLE DATA COLLECTION AGENT FOR FRACKING PUMP ASSET

(71) Applicant: Rockwell Automation Technologies, Inc., Mayfield Heights, OH (US)

(72) Inventors: Bijan Sayyarrodsari, Austin, TX (US); Francisco P. Maturana, Lyndhurst, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 379 days.

(21) Appl. No.: 15/646,689

(22) Filed: Jul. 11, 2017

(65) Prior Publication Data
US 2019/0018394 A1    Jan. 17, 2019

(51) Int. Cl.
*G05B 19/418*    (2006.01)
*G06Q 10/08*    (2012.01)
(Continued)

(52) U.S. Cl.
CPC .. *G05B 19/41865* (2013.01); *G05B 19/41885* (2013.01); *G06Q 10/0631* (2013.01);
(Continued)

(58) Field of Classification Search
CPC combination set(s) only.
See application file for complete search history.

(56) References Cited

U.S. PATENT DOCUMENTS

| 5,159,685 A | 10/1992 | Kung |
| 5,519,605 A | 5/1996 | Cawlfield |

(Continued)

FOREIGN PATENT DOCUMENTS

| CN | 1755564 | 4/2006 |
| CN | 1937559 | 3/2007 |

(Continued)

OTHER PUBLICATIONS

Yeung, Tony, et al. Equipment Consideration for Continuous High-Horsepower Fracturing Operations. Paper presented at the Canadian Unconventional Resources Conference, Calgary, Alberta, Canada, Nov. 2011 [online], [retrieved on Nov. 29, 2021]. Retrieved from the Internet <https:// https://onepetro.org/.*

(Continued)

*Primary Examiner* — Jerry O'Connor
*Assistant Examiner* — Michael R Koester

(57) ABSTRACT

A scalable industrial asset management system dynamically negotiates allocation of mobile industrial assets to industrial operation sites. The asset management system tracks and models the capabilities and availabilities of a pool of mobile industrial assets (e.g., truck-mounted assets or other such assets). Based on a defined demand of a scheduled industrial operation requiring mobile industrial assets (e.g., a fracking operation, a mining operation, etc.) the system selects a subset of the mobile industrial assets that are both available during the scheduled operation and are collectively capable of satisfying the demands of the industrial operation. Moreover, based on the asset models for the subset of mobile industrial assets, the system configures an on-premise cloud agent device to collect telemetry data from the mobile assets during the operation and to migrate the collected data to a cloud-based collection and analytics system.

20 Claims, 21 Drawing Sheets

(51) Int. Cl.
  *G06Q 10/06* (2012.01)
  *G06Q 10/10* (2012.01)
  *G06Q 10/00* (2012.01)

(52) U.S. Cl.
  CPC ....... *G06Q 10/0833* (2013.01); *G06Q 10/109* (2013.01); *G05B 2219/25419* (2013.01); *G06Q 10/20* (2013.01)

(56) References Cited

U.S. PATENT DOCUMENTS

| | | |
|---|---|---|
| 6,230,010 B1 | 5/2001 | Morris |
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 8,618,941 B2 | 12/2013 | Javey et al. |
| 8,649,500 B1 | 2/2014 | Cohen et al. |
| 8,667,589 B1 | 3/2014 | Saprygin et al. |
| 8,694,770 B1 | 4/2014 | Osburn, III |
| 9,438,648 B2 | 9/2016 | Asenjo et al. |
| 9,489,832 B2 | 11/2016 | Nair et al. |
| 9,552,143 B2 | 1/2017 | Javey et al. |
| 9,928,724 B2 | 3/2018 | Alcorn et al. |
| 9,954,972 B2 | 4/2018 | Asenjo et al. |
| 10,229,579 B2 | 3/2019 | Alcorn et al. |
| 2001/0053992 A1 | 12/2001 | Eto et al. |
| 2002/0116635 A1 | 8/2002 | Sheymov |
| 2002/0133270 A1 | 9/2002 | Hung et al. |
| 2002/0178159 A1 | 11/2002 | O'Brien |
| 2003/0014387 A1 | 1/2003 | Kreidler et al. |
| 2003/0033237 A1 | 2/2003 | Bawri |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1 | 7/2005 | Martin et al. |
| 2005/0159890 A1* | 7/2005 | Humphries ............. H04L 12/66 701/469 |
| 2005/0193285 A1 | 9/2005 | Jeon |
| 2005/0281263 A1 | 12/2005 | Miyamoto et al. |
| 2006/0068762 A1 | 3/2006 | Baldwin et al. |
| 2006/0174707 A1 | 8/2006 | Zhang |
| 2006/0294047 A1 | 12/2006 | Johnston et al. |
| 2007/0019641 A1 | 1/2007 | Pai et al. |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0052409 A1 | 2/2009 | Chen et al. |
| 2009/0089227 A1 | 4/2009 | Sturrock et al. |
| 2009/0172637 A1 | 7/2009 | Parikh |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0205021 A1* | 8/2010 | Jewett .................... G06Q 10/06 705/7.23 |
| 2010/0256794 A1 | 10/2010 | McLaughlin et al. |
| 2010/0256795 A1 | 10/2010 | McLaughlin et al. |
| 2010/0257228 A1 | 10/2010 | Staggs et al. |
| 2010/0289652 A1 | 11/2010 | Javey et al. |
| 2010/0318392 A1 | 12/2010 | Cassels et al. |
| 2011/0060907 A1 | 3/2011 | Hartmann et al. |
| 2011/0066298 A1 | 3/2011 | Francino et al. |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0144202 A1 | 6/2012 | Counterman |
| 2012/0166963 A1 | 6/2012 | Kohli et al. |
| 2012/0232869 A1 | 9/2012 | Maturana et al. |
| 2012/0237016 A1 | 9/2012 | Hegde et al. |
| 2012/0304247 A1 | 11/2012 | Badger et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1 | 7/2013 | Kephart et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0147064 A1 | 2/2014 | Maturana et al. |
| 2014/0115592 A1 | 4/2014 | Frean et al. |
| 2014/0156234 A1 | 6/2014 | Maturana et al. |
| 2014/0157368 A1 | 6/2014 | Shah et al. |
| 2014/0164124 A1 | 6/2014 | Rhoads |
| 2014/0207868 A1 | 7/2014 | Gordon et al. |
| 2014/0245208 A1 | 8/2014 | Javey et al. |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0277905 A1* | 9/2014 | Anderson ................ G07C 5/08 701/29.3 |
| 2014/0280796 A1 | 9/2014 | Pijewski |
| 2014/0282015 A1 | 9/2014 | Nixon et al. |
| 2014/0336785 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0337429 A1 | 11/2014 | Asenjo et al. |
| 2014/0337473 A1 | 11/2014 | Frusina et al. |
| 2015/0113627 A1 | 4/2015 | Curtis et al. |
| 2015/0120821 A1 | 4/2015 | Bendell |
| 2015/0135260 A1 | 5/2015 | Ilyadis et al. |
| 2015/0220080 A1 | 8/2015 | Nixon et al. |
| 2015/0277406 A1 | 10/2015 | Maturana et al. |
| 2015/0281319 A1 | 10/2015 | Maturana et al. |
| 2015/0281355 A1 | 10/2015 | Maturana et al. |
| 2015/0281453 A1 | 10/2015 | Maturana et al. |
| 2015/0287318 A1 | 10/2015 | Nair et al. |
| 2015/0316904 A1 | 11/2015 | Govindaraj et al. |
| 2015/0324502 A1 | 11/2015 | Eberhardt |
| 2015/0363902 A1 | 12/2015 | Wada et al. |
| 2015/0381744 A1 | 12/2015 | Na |
| 2016/0023351 A1 | 1/2016 | Kuffner et al. |
| 2016/0041565 A1 | 2/2016 | Edwards |
| 2016/0112283 A1 | 4/2016 | Maturana et al. |
| 2016/0125487 A1 | 5/2016 | Hamby |
| 2016/0142396 A1 | 5/2016 | McRoberts et al. |
| 2016/0163179 A1 | 6/2016 | Matsumoto et al. |
| 2016/0179993 A1 | 6/2016 | Maturana et al. |
| 2016/0182309 A1* | 6/2016 | Maturana ......... G05B 19/41885 709/224 |
| 2016/0256775 A1 | 9/2016 | Gustafson et al. |
| 2016/0282859 A1 | 9/2016 | Wilber et al. |
| 2016/0335875 A1 | 11/2016 | Alcorn et al. |
| 2016/0349140 A1 | 12/2016 | Teymouri |
| 2016/0350093 A1 | 12/2016 | Walker et al. |
| 2017/0102693 A1 | 4/2017 | Kidd et al. |
| 2017/0102694 A1 | 4/2017 | Enver et al. |
| 2017/0129512 A1* | 5/2017 | Shubs, Jr. ........... B61L 27/0094 |
| 2017/0212562 A1 | 7/2017 | Wang et al. |
| 2017/0238072 A1 | 8/2017 | Mackie et al. |
| 2018/0033087 A1 | 2/2018 | Delinselle et al. |
| 2018/0034913 A1 | 2/2018 | Matthieu et al. |

(56) References Cited

U.S. PATENT DOCUMENTS

| | | | |
|---|---|---|---|
| 2018/0182228 | A1 | 6/2018 | Alcorn et al. |
| 2018/0300639 | A1 | 10/2018 | Abbas |
| 2018/0356780 | A1 | 12/2018 | Halabieh |
| 2018/0367560 | A1 | 12/2018 | Mahaffey et al. |
| 2019/0049332 | A1 | 2/2019 | Shamir et al. |

FOREIGN PATENT DOCUMENTS

| | | | |
|---|---|---|---|
| CN | 103293953 | | 9/2013 |
| CN | 203466840 | | 3/2014 |
| CN | 103701953 | | 4/2014 |
| EP | 1422619 | | 5/2004 |
| EP | 2228965 | | 9/2010 |
| EP | 2541354 | | 1/2013 |
| EP | 2592812 | | 5/2013 |
| EP | 2660667 | | 11/2013 |
| EP | 2704401 | | 3/2014 |
| EP | 2 924 571 | A2 | 9/2015 |
| WO | 01/15001 | A2 | 3/2001 |
| WO | WO-2015152880 | A1 * | 10/2015 ............. E21B 43/00 |

OTHER PUBLICATIONS

Non-Final Office Action received for U.S. Appl. No. 15/271,752 dated Apr. 13, 2018, 56 pages.
Final Office Action received for U.S. Appl. No. 14/562,233 dated Jun. 15, 2018, 35 pages.
Extended European Search Report received for EP Patent Application Serial No. 18187973.5 dated Dec. 14, 2018, 6 pages.
Non-Final Office Action received for U.S. Appl. No. 15/676,337 dated Mar. 6, 2019, 74 pages.
Communication Pursuant to Rule 69 EPC received for EP Patent Application Serial No. 18187973.5 dated Feb. 25, 2019, 2 pages.
European Office Action for European Application Serial No. 15160984.9 dated Feb. 15, 2018, 7 pages.
European Office Action for European Application Serial No. 15160941.9, dated Jan. 15, 2018, 5 pages.
European Office Action for European Application Serial No. 15160868.4, dated Jan. 10, 2018, 8 pages.
European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.
Office Action for U.S. Appl. No. 14/639,279 dated Nov. 15, 2017, 75 pages.
Office Action for U.S. Appl. No. 14/562,233 dated Dec. 29, 2017, 36 pages.
Office Action for Chinese Application Serial No. 201510138371.0 dated Nov. 14, 2017, 5 pages.
Office Action for U.S. Appl. No. 15/431,128 dated Oct. 18, 2017, 37 pages.
Extended European Search Report received for EP Patent Application Serial No. 18182852.6 dated Nov. 22, 2018, 7 pages.
Communication Pursuant to Rule 69 EPC received for EP Patent Application Serial No. 18182852.6 dated Jan. 21, 2019, 2 pages.
Notice of Allowance received for U.S. Appl. No. 15/795,512 dated Feb. 6, 2019, 105 pages.
Final Office Action received for U.S. Appl. No. 15/271,752 dated Oct. 5, 2018, 35 pages.
Non-Final Office Action received for U.S. Appl. No. 15/966,546 dated May 10, 2019, 177 pages.
Notice of Allowance received for U.S. Appl. No. 15/676,337 dated Jul. 9, 2019, 37 pages.
Final Office Action received for U.S. Appl. No. 15/271,752 dated Aug. 1, 2019, 44 pages.
Office Action for U.S. Appl. No. 14/634,174, dated Aug. 4, 2016, 11 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action from U.S. Appl. No. 14/525,144, dated Sep. 9, 2016, 28 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
"Steiner, J. G., et al., ""Kerberos: An Authentication Service for Open Network Systems,"" Proceedings of the Winter UsenixConference, Feb. 9, 1988, pp. 191-202."
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.

(56) References Cited

OTHER PUBLICATIONS

Final Office Action for U.S. Appl. No. 14/525,149, dated Jul. 7, 2017, 77 pages.
Final Office Action for U.S. Appl. No. 14/562,233, dated Jul. 28, 2017, 33 pages.
Final Office Action for U.S. Appl. No. 14/639,279, dated Aug. 9, 2017, 66 pages.
Chinese Office Action and English Translation thereof dated Jul. 12, 2017, for Chinese Application Serial No. 201510138210.1, 17 pages.
Office Action for U.S. Appl. No. 14/525,149 dated Oct. 5, 2017, 88 pages.
Non-Final Office Action received for U.S. Appl. No. 15/271,752 dated Mar. 15, 2019, 32 pages.
Non-Final Office Action received for U.S. Appl. No. 15/692,213 dated Apr. 5, 2019, 64 pages.
Extended European Search Report received for EP Patent Application Serial No. 18191111.6 dated Feb. 12, 2019, 12 pages.
Communication Pursuant to Rule 69 EPC received for EP Patent Application Serial No. 18191111.6 dated Mar. 18, 2019, 2 pages.
Non-Final Office Action received for U.S. Appl. No. 15/271,752 dated Jan. 24, 2020, 39 pages.
Communication Pursuant to Article 94(3) EPC received for EP Patent Application Serial No. 18182852.6 dated May 18, 2020, 7 pages.
Notice of Allowance received for U.S. Appl. No. 15/271,752 dated May 1, 2020, 76 pages.
Peng et al., "Malware detection method for the industrial control systems," 2016 4th International Conference on Cloud Computing and Intelligence Systems (CCIS) Year: 2016 | Conference Paper | Publisher: IEEE.
Ray et al., "Future research challenges of secure heterogeneous industrial communication networks," 2016 IEEE 21st International Conference on Emerging Technologies and Factory Automation (ETFA) Year: 2016 | Conference Paper | Publisher: IEEE.
Notice of Allowance received for U.S. Appl. No. 16/592,376 dated Jun. 15, 2020, 73 pages.
European Patent Office, "Communication pursuant to Article 94(3) EPC", application No. 18182852.6, EPO, dated Feb. 15, 2021, 8 pages.

* cited by examiner

DYNAMICALLY RECONFIGURABLE DATA COLLECTION AGENT FOR FRACKING PUMP ASSET

BACKGROUND

The subject matter disclosed herein relates generally to industrial control and monitoring, and, more particularly, to selective allocation of distributed industrial assets, including mobile industrial assets.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for managing mobile industrial assets is provided, comprising an asset model definition component configured to generate asset models corresponding to respective mobile industrial assets, the asset models defining an asset type, an asset capability, and an availability schedule of the respective mobile industrial assets; and an asset scheduling component configured to, in response to receipt of industrial operation data defining functional demands of a scheduled industrial operation, select a subset of the asset models defining respective asset types and asset capabilities that collectively satisfy the functional demands defined by the industrial operation data, and generate asset scheduling data that configures a cloud agent device to collect telemetry data from a subset of the mobile industrial assets corresponding to the subset of the asset models.

Also, one or more embodiments provide a method for scheduling and monitoring mobile industrial assets, comprising generating, by a system comprising a processor, asset models corresponding to respective mobile industrial assets, wherein the asset models define an asset type, an asset capability, and an availability of the respective mobile industrial assets; selecting, by the system based on industrial operation data defining functional demands of a scheduled industrial operation, a subset of the asset models that define respective asset types and asset capabilities that collectively satisfy the functional demands defined by the industrial operation data; and generating, by the system, asset scheduling data that configures a cloud agent device to collect telemetry data from a subset of the mobile industrial assets corresponding to the subset of the asset models.

Also, according to one or more embodiments, a non-transitory computer-readable medium is provided having stored thereon instructions that, in response to execution, cause a system to perform operations, the operations, comprising generating asset models corresponding to respective mobile industrial assets, wherein the asset models define an asset type, an asset capability, and an availability of the respective mobile industrial assets; selecting, based on industrial operation data defining functional demands of a scheduled industrial operation, a subset of the asset models that define respective asset types and asset capabilities that collectively satisfy the functional demands defined by the industrial operation data; generating, based on the subset of the asset models, asset scheduling data that configures a cloud agent device to collect telemetry data from a subset of the mobile industrial assets corresponding to the subset of the asset models.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
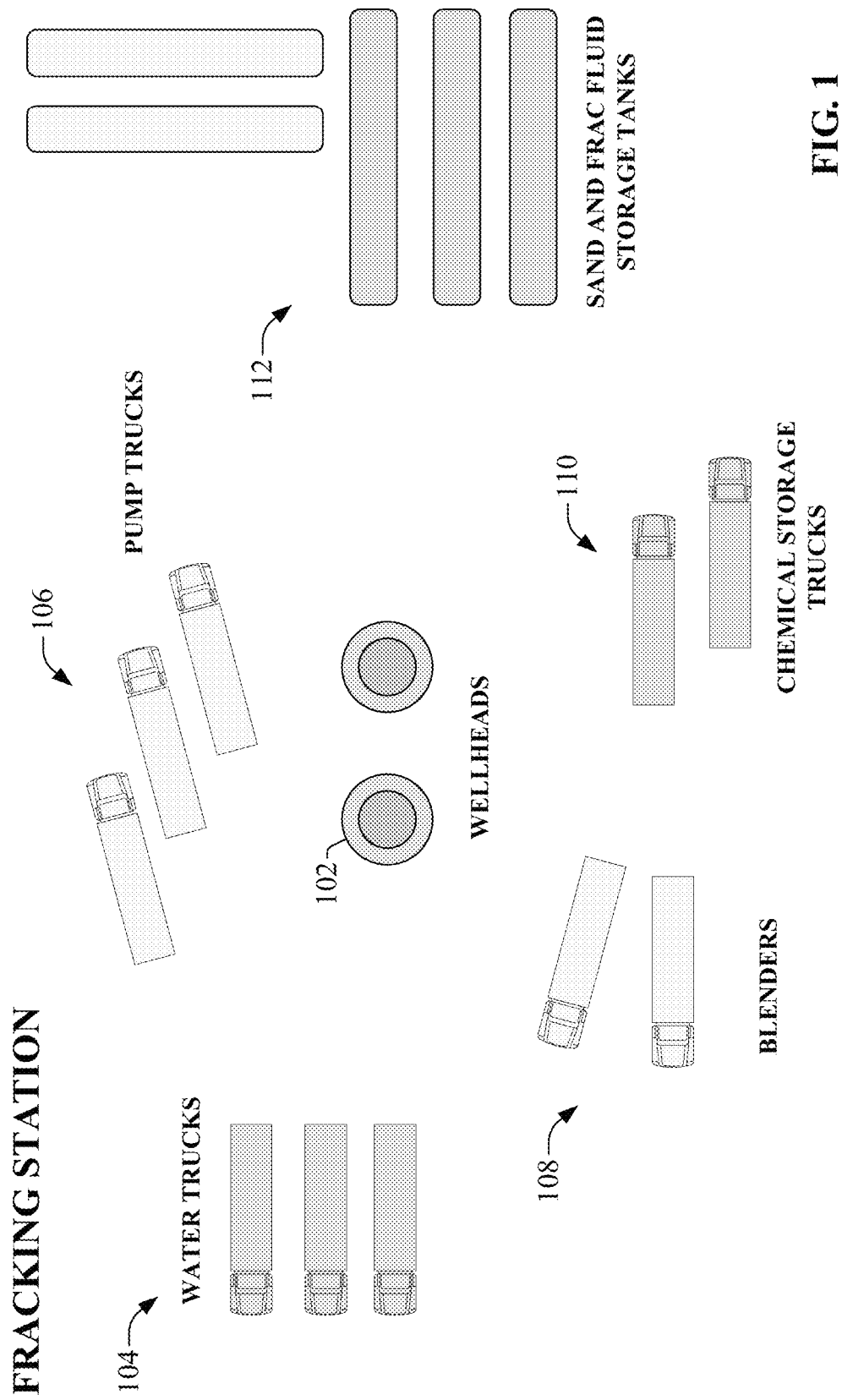
FIG. 1 is a generalized diagram illustrating industrial assets and equipment associated with a fracking station.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. In conventional plant facilities comprising substantially fixed industrial systems and assets, these controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback, electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

These issues are further complicated in cases of industrial systems in which some of the industrial assets are mobile and capable of use at any of several different work sites, as in the case of hydraulic fracking station operations. FIG. 1 is a generalized diagram illustrating industrial assets and equipment associated with a fracking station. A number of different types of trucks are deployed to the fracking station to carry out a fracking operation in which natural gas is extracted from the wells (capped by wellheads 102). These include water trucks 104 that provide water for the fracking process, blender trucks 108 that mix the water with other additives, pump trucks 106 that pump the mixture into the wells, and chemical storage trucks 110 that provide chemicals for the mixtures. A number of fixed storage tanks 112 for storing sand and frack fluid are also located on-site at the fracking station.

Trucks 104, 106, 108, and 110 are considered mobile industrial assets that are deployed from a pool of available trucks to selected fracking stations, where the trucks are attached to the pumping process as needed. During a fracking operation, both mobile industrial assets (e.g., trucks 104, 106, 108, and 110) and fixed industrial assets generate telemetry data that could beneficially be collected, stored, and analyzed to facilitate asset tracking and optimization of asset utilization. However, because the mobile assets selected for deployment to a fracking station for a given fracking operation depend on the status or availability of the trucks (e.g., in service, on-site, ready for deployment, etc.), the collection of assets that make up the composite fracking system often changes between fracking operations, and in some cases may not be known until shortly before the fracking operation begins. The frequently changing sets of mobile assets used to carry out frack pumping operations at a given fracking station create challenges with regard to devising a data collection and analysis solution for fracking operations, or for other operations in which mobile industrial assets are utilized.

To address these and other issues, one or more embodiments of the present disclosure provide a scalable mobile asset management system for dynamically allocating mobile assets to scheduled industrial operations (e.g., fracking station operations, a mining station operations, power distribution operations, or other types of industrial operations), and for dynamically configuring data collection and analysis for the collection of allocated mobile assets. The platform uses an agent-based architecture to gather industrial data from both fixed and mobile industrial data sources at the industrial site and to send the data to a cloud-based platform for storage and analysis. Cloud agent devices, in conjunction with the cloud-based platform, can dynamically create asset-level data manifests that configure on-site data collection based on the particular collection mobile assets that have been deployed to the facility. The cloud-based asset management system can maintain dynamically updated asset models for each mobile asset that track the asset's capabilities, location, remaining life span, maintenance and/or work schedules, or other such information. These models are correlated with the expected demand requirements of a scheduled industrial operation in order to determine a recommended subset of available mobile assets to be assigned to the scheduled operation.

Figure 2:
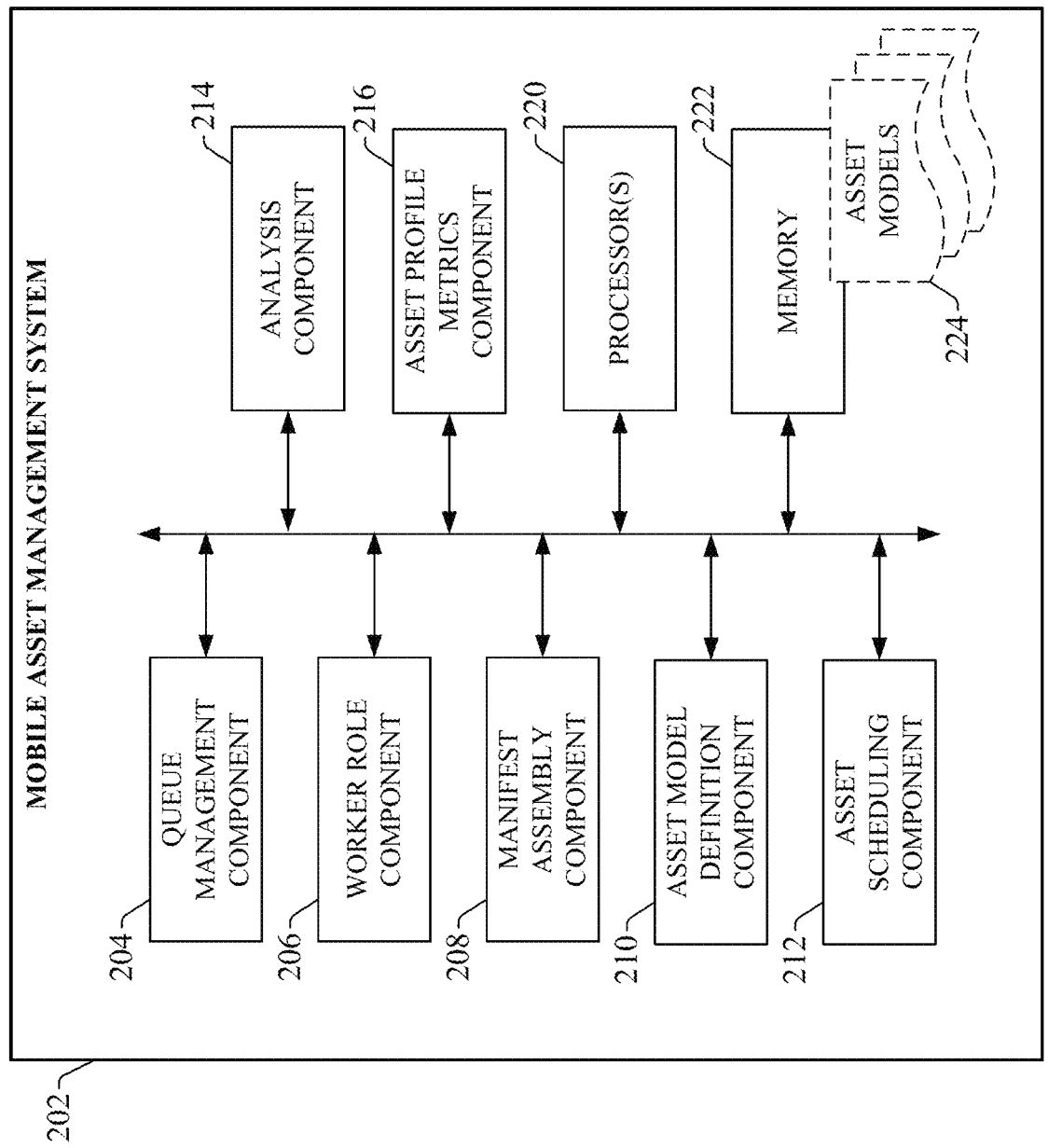
FIG. 2 is a block diagram of an example mobile asset management system.

FIG. 2 is a block diagram of an example mobile asset management system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Mobile asset management system 202 can include a queue management component 204, a worker role component 206, a manifest assembly component 208, an asset model definition component 210, an asset scheduling component 212, an analysis component 214, an asset profile metrics component 216, one or more processors 220, and memory 222. In various embodiments, one or more of the queue management component 204, worker role component 206, manifest assembly component 208, asset model definition component 210, asset scheduling component 212, analysis component 214, asset profile metrics component 216, the one or more processors 220, and memory 222 can be electrically and/or communicatively coupled to one another to perform one or more of the functions of the mobile asset management system 202. In some embodiments, components 204, 206, 208, 210, 212, 214, and 216 can comprise software instructions stored on memory 222 and executed by processor(s) 220. Mobile asset management system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

Queue management component 204 can be configured to receive compressed data packets from one or more cloud agent devices residing at an industrial facility (e.g., a fracking station, a mining station, or other type of industrial facility) and organize the industrial data contained in the packets into priority queues that respectively define how the data packets are to be processed by cloud processing services. The worker role component 206 can be configured to determine how the data in the respective queues is to be processed based on manifest data stored in a customer-specific manifest assembly. Manifest assembly component 208 can be configured to create, update, and manage manifest data (also referred to as manifests) within customer-specific manifest assemblies on the cloud platform. The manifest data defines and implements customer-specific capabilities, applications, and preferences for processing collected data in the cloud. Manifest assembly component 208 can build the manifest data dynamically based on the particular collection of mobile assets that are in use, or are to be used, at the industrial facility to carry out a given industrial operation. In some embodiments, the manifest assembly component 208 can update the manifest data based on asset-level manifest data sent to the mobile asset management system 202 by one or more on-premise agent devices (e.g., on-premise agent device 302 to be described below) residing at the industrial facility.

The asset model definition component 210 can be configured to generate, update, and store asset models 224 corresponding to respective mobile industrial assets. These asset models 224 can define, for each mobile asset, such information as a type of the asset (e.g., a water truck, a pump truck, a blender, etc.), a current status of the asset (e.g., available, in maintenance, etc.), capabilities of the asset, a total number of accumulated operating hours for the asset, an anticipated operating schedule for the asset, or other such information. Asset scheduling component 212 can be configured to select, based on defined requirements of an industrial operation to be performed and information contained in the asset models 224, a subset of the mobile assets to be assigned to the industrial operation (e.g., a fracking operation, a mining operation, etc.).

Analysis component 214 can be configured to perform user-defined analytics on subsets of the data received from the one or more cloud agent devices. Asset profile metrics component 216 can be configured to calculate metrics on respective different combinations of the mobile assets in connection with performance of an industrial operation. These asset profile metrics can include metrics relating to costs associated with using the collection of assets, an efficiency achieved when the collection of assets is used to carry out the industrial operation, an amount of energy consumed by the collection of assets in connection with performing the industrial operation, or other such metrics. These asset profile metrics can be used by the mobile asset management system (e.g., the asset scheduling component 212) to select an asset profile—i.e., a particular combination of assets—to be assigned to a scheduled industrial operation.

The one or more processors 220 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Figure 3:
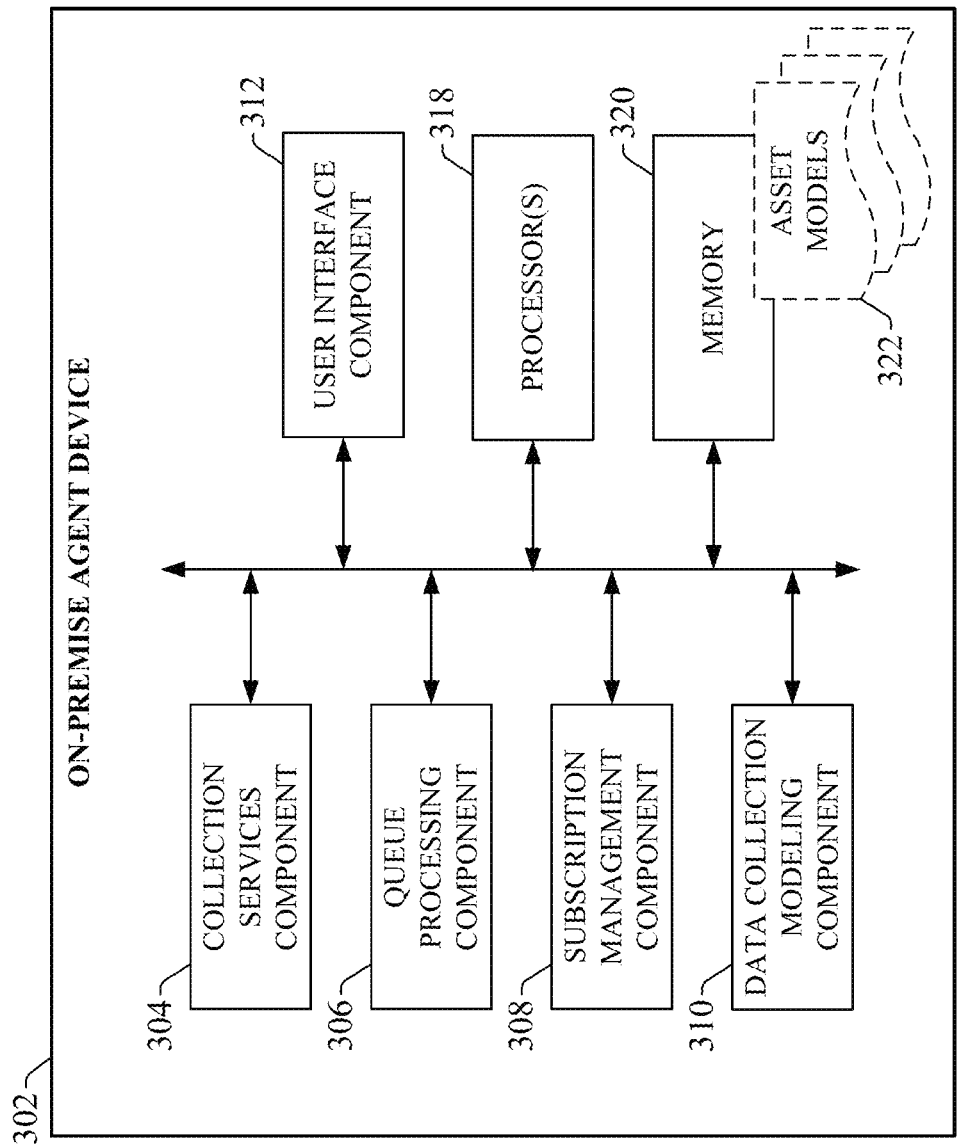
FIG. 3 is a block diagram of an example on-premise agent device.

FIG. 3 is a block diagram of an example on-premise agent device 302 according to one or more embodiments of this disclosure. On-premise agent device 302 can include a collection services component 304, a queue processing component 306, a subscription management component 308, a data collection modeling component 310, a user interface component 312, one or more processors 318, and memory 320. In various embodiments, one or more of the collection services component 304, queue processing component 306, subscription management component 308, data collection modeling component 310, user interface component 312, the one or more processors 318, and memory 320 can be electrically and/or communicatively coupled to one another to perform one or more of the functions of the on-premise agent device 302. In some embodiments, components 304, 306, 308, 310, and 312 can comprise software instructions stored on memory 320 and executed by processor(s) 318. On-premise agent device 302 202 may also interact with other hardware and/or software components not depicted in FIG. 3. For example, processor(s) 318 may interact with one or more external user interface devices, such as a keyboard, a mouse, a display monitor, a touchscreen, or other such interface devices.

Collection services component 304 can be configured to collect industrial data from fixed and mobile industrial assets, either from a data concentrator or directly from the industrial assets themselves. Collection services component 304 can also be configured to pre-process the collected data for transmission to a cloud platform; e.g., by compressing the data and storing the data in a compressed data file. Queue processing component 306 can be configured to package a compressed data file prepared by the collection services component 304 into a data packet and push the data packet to the cloud platform. Subscription management component 308 can be configured to maintain customer-specific configuration and subscription information. This information can be accessed by the queue processing component 306 to determine how the compressed data file should be packaged, and how to connect to the customer's cloud platform for transmission of the data packets.

Data collection modeling component 310 can be configured to generate manifest data based on the collection of mobile assets assigned to a present industrial operation (e.g., a natural gas pumping operation), and use the manifest data to configure data collection for the industrial operation. The data collection modeling component 310 dynamically customizes the manifest data to reflect the telemetry available from the particular cluster of mobile assets assigned to the current industrial operation. The resulting manifest data can be used to configure collection services component 304 for local data collection based on the mobile assets assigned to the industrial operation. Additionally, the on-premise agent device 302 can send the manifest data to a cloud-based mobile asset management system 202 to configured cloud-side data collection and processing for the industrial operation. In some embodiments, the manifest data can be generated based on a subset of stored asset models 322 representing the mobile assets in use at the industrial site.

User interface component 312 can be configured to receive user input and to render output to the user in any suitable format (e.g., visual, audio, tactile, etc.). In some embodiments, user interface component 312 can be configured to communicate with a graphical user interface that executes on a separate hardware device (e.g., a laptop computer, tablet computer, smart phone, etc.) communicatively connected to on-premise agent device 302. In such configurations, user interface component 312 can receive input parameter data entered by the user via the graphical user interface, and deliver output data (e.g., drive performance metric data) to the interface.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
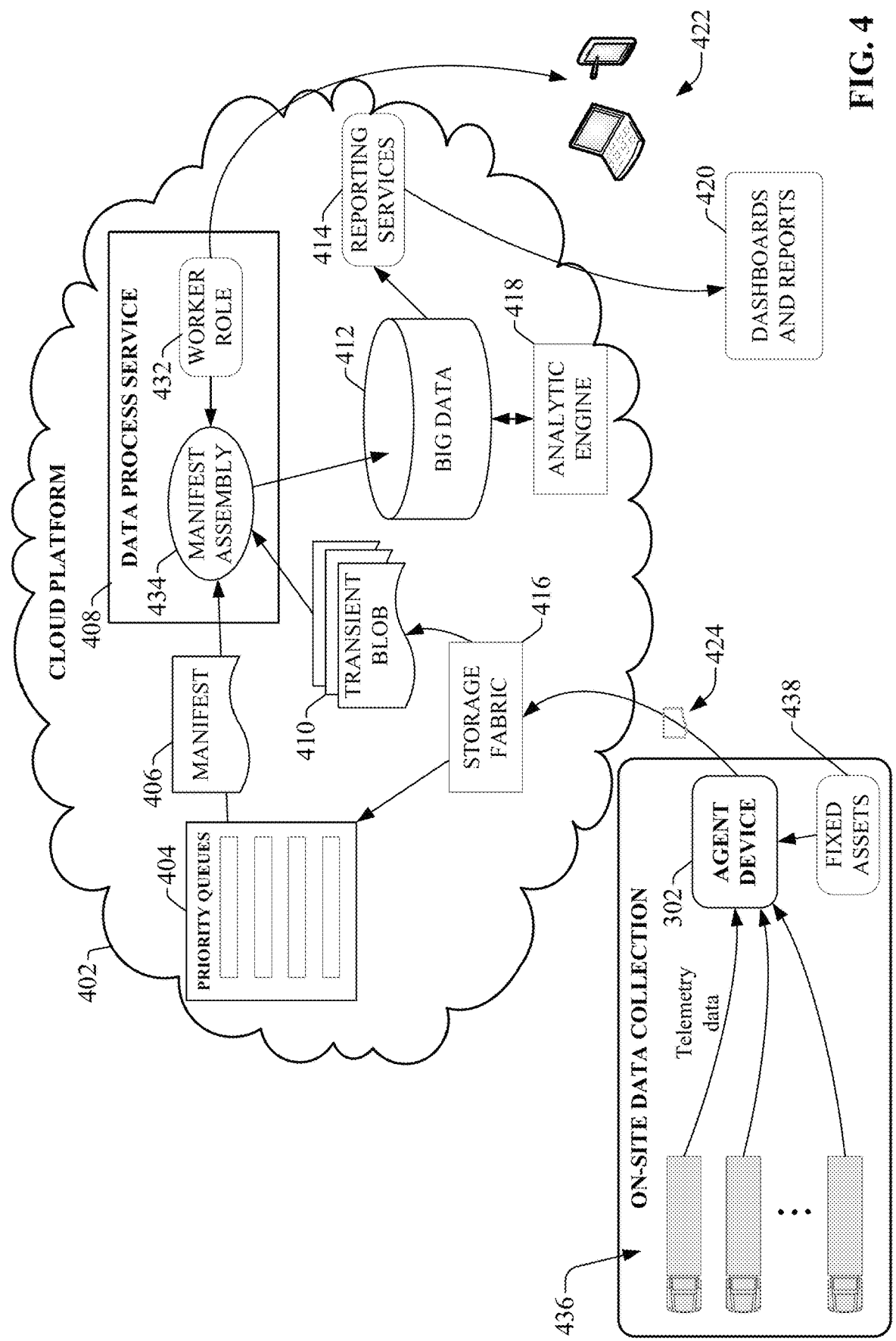
FIG. 4 is an overview of an example architecture that leverages an agent-based cloud infrastructure to provide industrial data collection and processing services.

FIG. 4 is an overview of an example architecture that leverages an agent-based cloud infrastructure to provide industrial data collection and processing services. This system can provide remote collection and monitoring services in connection with alarm and event notification for critical industrial assets, historical data collection, remote system access, system optimization, remote closed-loop control, and other such applications. The example cloud-based infrastructure depicted in FIG. 4 enables remote monitoring and reporting of on-premise assets—including both fixed assets and mobile assets—by implementing six general areas of functionality—data ingestion into the cloud, data priority, object modeling, data processing, data analytics, and reporting. Although embodiments of the dynamic mobile asset allocation systems and methods are described herein in connection with the example cloud-based architecture depicted in FIG. 4, it is to be appreciated that the mobile asset allocation techniques are not limited to use with the particular data collection architecture depicted in FIG. 4.

In the example illustrated in FIG. 4, an on-premise agent device 302 collects telemetry data from industrial assets at a facility, such as a fracking station or other industrial site. Agent device 302 collects the telemetry data from both fixed assets 438 at the facility and mobile assets 436. In the case of a fracking station, the mobile assets 436 may be water trucks, pump tricks, blenders, chemical storage trucks, or other such mobile industrial assets that have been assigned to the facility for a present industrial operation (e.g., a frack pumping operation). Fixed assets can include, for example industrial controllers that monitor and control industrial I/O devices, data servers and historians, motor drives, remote I/O interfaces that remotely interface groups of I/O devices to one or more of the industrial controllers, boilers or other industrial machines, or other such assets. For example, agent device 302 can monitor one or more controller tags defined in a tag archive and store data in local data storage (e.g., a local structured query language, or SQL, server) associated with the agent device 302 (e.g., memory 320). The collected data can include historical data (e.g., alarm history, status history, trend data, etc.), live data values read from the industrial assets, alarm data generated by the industrial assets, or other types of data.

On-premise cloud agent device 302 is configured to collect the live or historical data from the fixed and mobile industrial assets either directly (e.g. via a wireless or hard-wired communication connection to the data sources associated with the assets) or by accessing data storage associated with an on-premise data concentrator that collects the data from at least a subset of the assets. Cloud agent device 302 can execute on any suitable hardware platform (e.g., a server, a LINUX box, etc.), and acts as a gateway that collects data items from the various industrial assets and packages the collected data according to a generic, uniform data packaging schema used to move the on-premise data to a cloud platform 402. On-premise agent device 302 provides a software mechanism to dynamically link on-premise-to-cloud gateways. Agent device 302 can provides an expandable data type schema that allows new data types to be added without the need to redeploy the monitoring system to the cloud.

During data collection, agent device 302 can intelligently sort and organize the data based on defined criteria, including but not limited to time of occurrence and/or user-defined priorities. In one or more embodiments, collection services component 304 of agent device 302 can execute a service (e.g., a Windows service) that periodically collects and transmits serialized and compressed data into the cloud domain using standard web services over HTTPS/SSL. Some embodiments of agent device 302 can collect data from the industrial assets themselves through a common industrial protocol link, or through middleware applications such as OPC clients.

Figure 5:
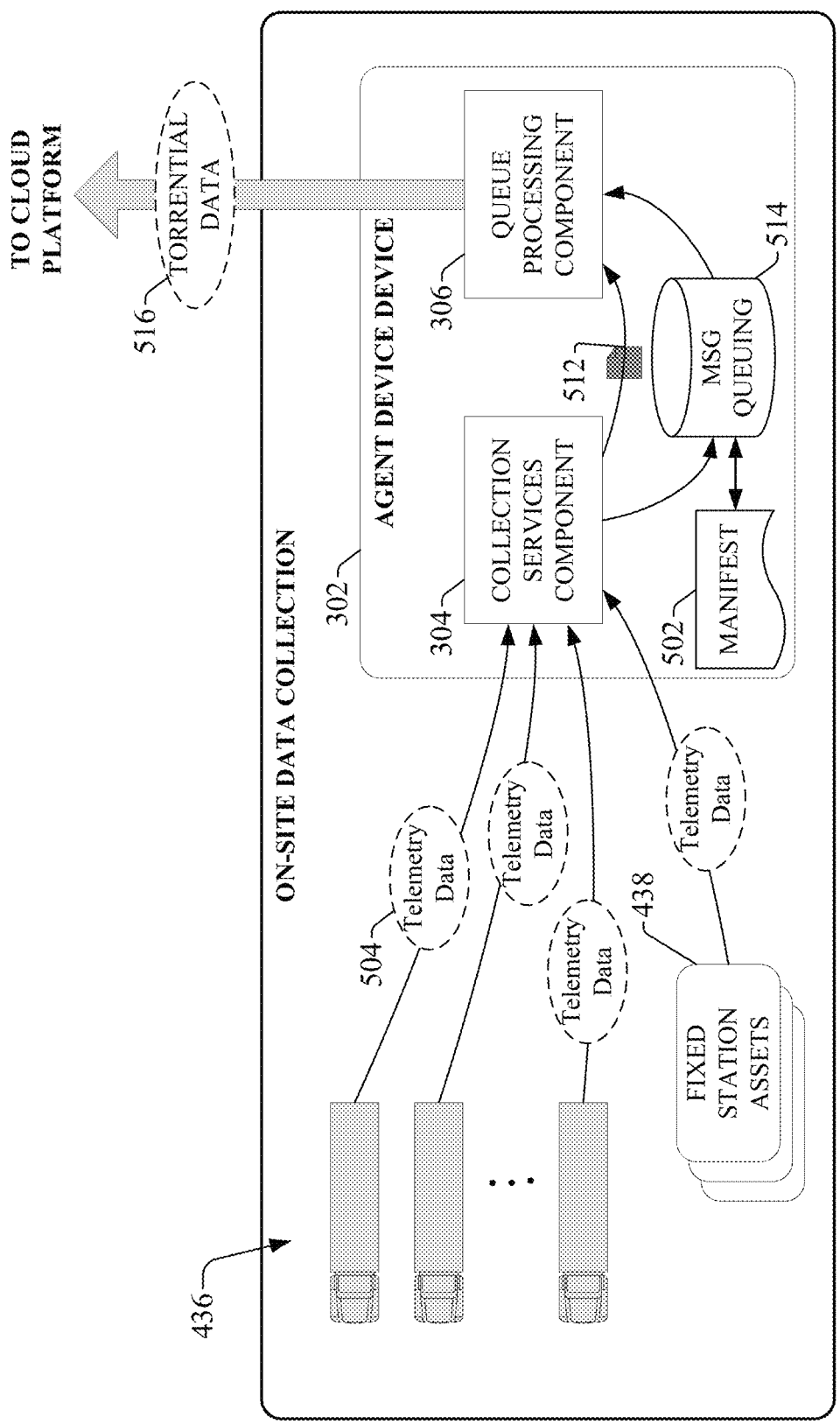
FIG. 5 is a diagram illustrating example cloud agent device functionality.

Cloud agent functionality is illustrated in more detail with reference to FIG. 5. On-premise data collection is enabled by a collection of services that function to process data. As noted above, telemetry data 504 and/or other industrial data is collected from mobile industrial assets 436 (e.g., equipment trucks or other mobile systems) and fixed industrial assets (e.g., industrial controllers or motor drives mounted in a control cabinet, etc.) by collection services implemented by collection services component 304 of on-premise agent device 302. In some embodiments, agent device 302 can collect the telemetry data 504 via a wired or wireless common industrial protocol (CIP) link or other suitable communication protocol. Collection services component 304 can then compress the data and store the data in a compressed data file 512. Queue processing services executed by queue processing component 306 can then read the compressed data file 512 and reference a message queuing database 514, which maintains and manages customer-specific and operation-specific data collection configuration information defined by on-premise manifest data 502, as well as information relating to the customer's subscription to the cloud platform and associated cloud services. As will be described in more detail below, on-premise manifest data 502 is generated dynamically by data collection modeling component 310 based on the collection of mobile assets 436 currently being used to carry out the industrial operation. Based on configuration information defined by manifest data 502, queue processing component 306 packages the compressed data file 512 into a data packet and pushes the data packet to the cloud platform. In some embodiments, agent device 302 can support injecting data packets as torrential data 516.

Dynamically configured manifest data 502 can define site-specific and operation-specific information identifying the data items to be collected (e.g., data tag or data point identifiers corresponding the data items available for collection on the various mobile assets 436 and fixed assets 438 in use), user-defined processing priorities for the data tags, firewall settings that allow agent device 302 to communicate with the cloud platform through a plant firewall, and other such configuration information. Configuration information in message queuing database 514 (including information specified by manifest data 502) instructs agent device 302 how to communicate with the identified data tags of mobile assets 436 and fixed assets 438 (e.g., by defining communication paths to the data tags for retrieval of telemetry data 504), and with the remote data collection services on the cloud platform.

In addition to collection and migration of data, one or more embodiments of agent device 302 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 340 may be configured to compress the collected data using any suitable data compression algorithm prior to migrating the data to the cloud platform. This can include detection and deletion of redundant data bits, truncation of precision bits, or other suitable compression operations. In another example, agent device 302 may be configured to aggregate data by combining related data from multiple sources. For example, data from multiple sensors measuring related aspects of an automation system can be identified and aggregated into a single cloud upload packet by agent device 302. Agent device 302 can also encrypt sensitive data prior to upload to the cloud. In yet another example, agent device may filter the data according to any specified filtering criterion (e.g., filtering criteria defined in a filtering profile stored on the cloud agent device). For example, defined filtering criteria may specify that pressure values exceeding a defined setpoint are to be filtered out prior to uploading the pressure values to the cloud.

In some embodiments, agent device 302 can also transform a specified subset of the industrial data from a first format to a second format in accordance with a requirement of a cloud-based analysis application. For example, a cloud-based reporting application may require measured values in ASCII format. Accordingly, agent device 302 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Agent device 302 may also associate metadata with selected subsets of the data prior to migration to the cloud, thereby contextualizing the data within the industrial environment. For example, agent device 302 can tag selected subsets of the data with a time indicator specifying a time at which the data was generated, a quality indicator, a production area or station indicator specifying a work site (e.g., a fracking station, a mining station, a power plant, etc.) or a production area within an industrial enterprise from which the data was collected, an asset state indicator specifying a state of an industrial asset at the time the data was generated, a personnel identifier specifying an employee on duty at the time the data was generated, or other such contextual metadata. In this way, agent device 302 can perform layered processing of the collected data to generate meta-level knowledge that can subsequently be leveraged by cloud-based analysis tools to facilitate enhanced analysis of the data in view of a larger plant context.

To ensure secure outbound traffic to the cloud platform, one or more embodiments of agent device 302 can support HTTPS/SSL, certificate authority enabled transmission, and/or unique identity using MAC addresses. Agent device 302 can also support store-and-forward capability to ensure data is not lost if the agent becomes disconnected from the cloud.

Returning now to FIG. 4, agent device 302 sends compressed data packet 424 to the cloud-based data collection and monitoring system on cloud platform 402 via a cloud storage fabric 416. The data packet 424 conveys parameters and data (compressed and serialized) used by the cloud-side services to reconstruct the domain data structure in the cloud using auxiliary tenant-level manifests. The cloud services direct remote storage of the received data into preconditioned transient blobs 410. The cloud platform 402 can use agent reasoning and collective bargain features to determine a data storage locale.

Through the configuration interface provided by agent device 302 (or through another configuration interface configured to configure data processing in the cloud platform 402), users at the industrial site can dynamically configure one or more priority queues 404 (also referred to as data queues) that respectively define how the data packets are processed in the cloud platform 402. For example, separate queues may be defined for alarms, live data, historical data, or other data categories, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and agent device 302 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time data monitored for the mobile assets 436 and fixed assets 438, such as current temperatures, current pressures, etc. The live data values can also be accessed through the API (e.g., a SQL API).

Also, in some scenarios, data queues can be associated with respective different types of mobile assets. For example, separate queues can be configured for pump trucks, water trucks, blenders, or other categories of mobile assets. Additionally, data from each individual mobile asset can be segregated so that asset models 224 defining asset performance statistics and capabilities can be generated and maintained for each mobile asset 436.

The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, agent device 302 can allow the user to define these priority queues 404 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through agent device 302, users can assign priorities to respective data tags or tag groups at the customer site. These priority assignments can be stored in the message queuing database 514 of agent device 302. Accordingly, when queue processing component 306 packages the collected data to be moved to the cloud platform 402, the collected data items can be packaged into data packets according to priority (as defined in message queuing database 514), and the respective data packet headers populated with the appropriate priority level. If access to the cloud platform is unavailable, data will continue to be collected by collection services component 304 and stored locally on the cloud agent in local storage associated with collections services. When communication to the cloud platform is restored, the stored data will be forwarded to cloud storage. Queue processing services can also encrypt and send storage account keys to the cloud platform for user verification.

Figure 6:
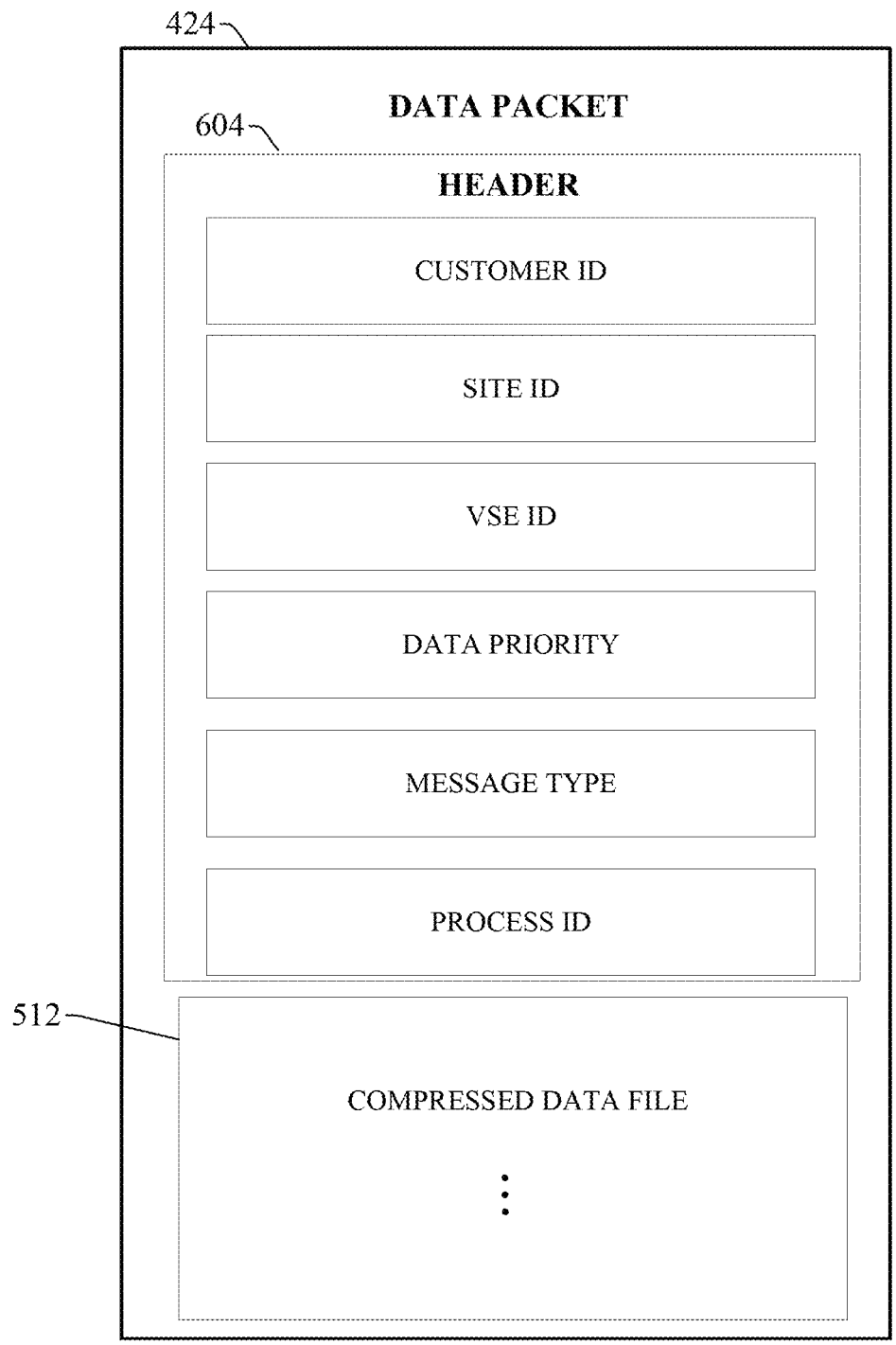
FIG. 6 is a diagram illustrating an example format of a compressed data packet.

In some embodiments, message queuing services implemented by queue processing component 306 of agent device 302 encapsulate or package the compressed data file by adding customer-specific header information to yield a compressed data packed (e.g., compressed data packet 424 of FIG. 4). For example, the queue processing component 306 can access a message queuing database (e.g., message queuing database 514 of FIG. 5), which stores customer site configuration information and manages the customer's subscription to the cloud platform services. The message queuing database 514 may include such information as a customer identifier associated with the customer entity associated with the industrial enterprise, a site identifier associated with a particular industrial site (e.g., a fracking station, a power plant, etc.) from which the data was collected, a priority to be assigned to the data (which may be dependent on the type of information being sent; e.g., alarm data, historical data, live operational data, etc.), information required to facilitate connection to the customer's particular cloud storage fabric 416, or other such information. The information included in the header is based on this customer-specific information maintained in the message queuing database 514. An example compressed data packet is illustrated in FIG. 6. As shown, the agent device's message queuing services add a header 604 to compressed data file 512 to yield the compressed data packet 424. The header 604 contains customer-specific data read from message queuing database 514. For example, header 604 can include a unique customer identifier, a site identifier representing a particular industrial site or plant facility, a virtual support engineer identifier, a data priority for the data in the compressed data file 512, a message type, and a process identifier that specifies a particular manifest application on the cloud platform that should be used to process the data on the cloud side. Packaging the data in this way can allow data from diverse data sources to be packaged together using a uniform, generic data packaging schema so that the data can be moved to the cloud infrastructure When agent device 302 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 404 based on the priority. On the other side of the priority queues 404, a data process service 408 processes data in the respective priority queues 404 according to the predefined processing definitions. The data processing service includes a worker role 432 that determines how the queued data is to be processed based on cloud-level manifest data 406 (e.g., system manifests, tag manifests, and/or metric manifests) stored in a customer-specific manifest assembly 434. Manifest data 406 defines and implements customer-specific and operation-specific capabilities, applications, and preferences for processing collected data in the cloud. Cloud-level manifest data 406 can be dynamically uploaded to the cloud platform 402 by agent device 302, which facilitates dynamic extension of cloud computing capability.

For example, when a new operation is to be performed using a subset of available mobile assets, new data points corresponding to the telemetry of the mobile assets in use can be added to the data collection system. These new data points may be linked to existing data queues, or may require creation of a new data queue. In either case, when the particular set of mobile assets 436 that will be carrying out the present operation (e.g., a frack pumping operation, a mining operation, etc.), have been determined, agent device 302 can configure new on-premise manifest data 502 for configuring the agent device 302 for collection of the telemetry data from the mobile assets 436. The agent device 302 can also send cloud-level manifest data 406 defining destination data queues for the new data points. One or both of the on-premise manifest data 502 or the cloud-side manifest data 406 can define such aspects as communication pathways for collecting each data item, processing priorities for the data, upload frequencies for the data, cloud storage locations to which the data is to be routed or stored, and other such information. Agent device 302 can upload the new cloud-level manifest data 406 for the present operation together with the data (or independently of the data).

The cloud-level manifest data 406 is added to the customer's manifest assembly 434 with other manifests defined for the customer, so that worker role 432 can leverage the new manifest data 406 to determine how the data for the present industrial operation is to be processed. This new manifest data 406 need only be uploaded to the cloud-based remote monitoring service once for the present industrial operation. Thereafter, data placed in the indicated priority queues will be processed by worker role 432 according to the new manifest data 406 stored in the customer's manifest assembly 434. For example, the manifest data 406 may define where the data is to be stored within cloud storage (e.g., in a historical database, and Alarms and Live Data database, big data storage 412, etc.), and whether processing of the new data queue is to take priority over other data queues. In some embodiments, the manifest assembly 434 may only accept new manifest data if the manifest data is accompanied by a unique key associated with the client.

Once the cloud-based infrastructure has processed and stored the data provided by agent device 302 according to the techniques described above, the data—or analytic results generated as a result of processing the data—can be made accessible to client devices 422 for viewing. In some embodiments, data analytics on the cloud platform 402 can provide a set of web-based and browser-enabled technologies for retrieving, directing, and uncompressing the data from the cloud platform 402 to the client devices 422. To this end, reporting services 414 can deliver data in cloud storage (e.g., from the big data storage 412) to the client devices 422 in a defined format. For example, reporting services 414 can leverage collected data stored in the cloud repository to provide remote operator interfaces to client devices 422 over the Internet. An analytic engine 418 executing on the cloud platform 402 (implemented by analysis component 214) can also perform various types of analysis on the data stored in big data storage 412 and provide results to client devices 422.

Since the agent device 302 encapsulates the on-premise data collected from mobile and fixed industrial assets into envelopes containing customer-specific and application-specific information, the compressed data packets convey the parameters and data required by the mobile asset management system 202 to identify the appropriate manifest stored in the customer's manifest assembly (e.g., manifest assembly 434) for handling, processing, and/or routing of the data contained in the compressed data file.

Figure 7:
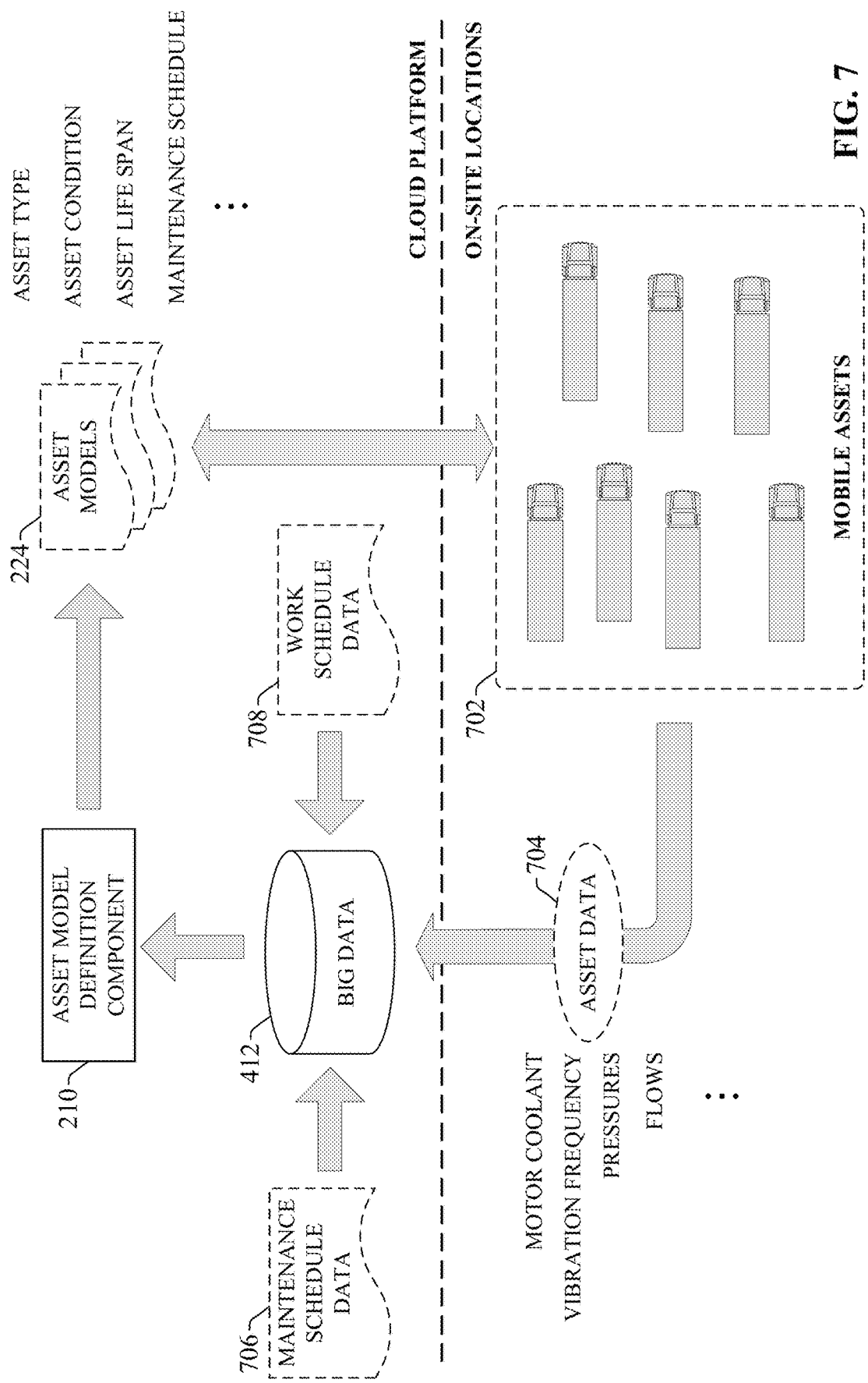
FIG. 7 is a diagram illustrating creation of asset models for a pool of available mobile assets.

As noted above, mobile asset management station 202 can generate and maintain asset models 224 for respective mobile assets based on various types of data collected for the assets. FIG. 7 is a diagram illustrating creation of asset models 224 for a pool of available mobile assets 702. In the case of fracking operations, mobile assets 702 can include various types of systems mounted on trucks, including water trucks, pump trucks, chemical storage trucks, blenders, etc. (see FIG. 1). However, mobile assets 702 are not limited to assets used in fracking operations. For example, in other types of industrial enterprises, mobile assets 702 may include mobile power generators, mobile cooling systems, mobile computing systems, or substantially any other type of mobile industrial asset. Mobile assets 702 represent a pool of mobile assets owned by an industrial enterprise that can be put into service at a work site, and can include mobile assets that are out of service but available for deployment, out of service (e.g., in maintenance or waiting for maintenance), or currently in operation at a work site.

On the cloud platform, asset model definition component 210 of mobile asset management system 202 creates and maintains a set of asset models 224 corresponding to the respective available mobile assets 702. In general, an asset model 224 for a given mobile asset contains updated information regarding the asset's status, capability, and schedule. This information can be used by the asset scheduling component 212 to select a suitable subset of the available mobile assets 702 to be scheduled for deployment to a work site for a scheduled industrial operation.

Figure 8:
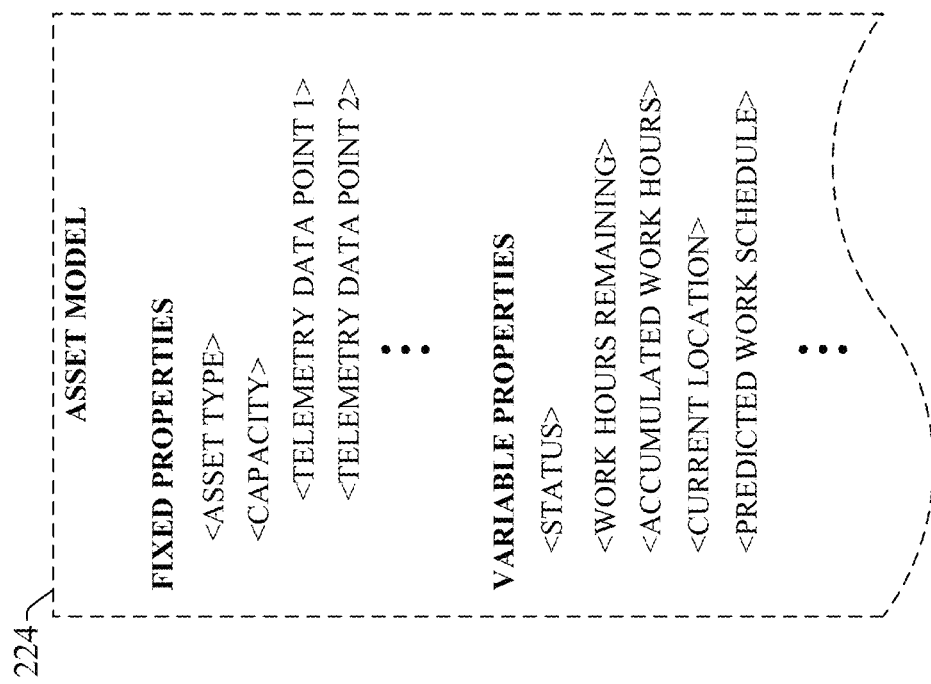
FIG. 8 is a representation of an example asset model depicting example types of information that can be maintained in the asset models.

FIG. 8 is a representation of an example asset model 224 depicting example types of information that can be maintained in the asset models 224. An asset model 224 for a given mobile asset 702 can include both fixed properties of the asset as well as dynamically updated variable properties. Fixed asset properties defined by the asset model 224 can include such information as a type of the asset (e.g., a water truck, a pump truck, a blender, a power generator, etc.) a capacity or capability of the asset (e.g., a rated horsepower, a rated pumping pressure or flow rate, a rated power output, a rated speed, etc.), and information regarding available telemetry data points that can monitored for the asset. Telemetry data point information can include, for example, a description of the data point (e.g., motor drive voltage, motor speed, flow rate, water pressure, chemical tank level, etc.); information regarding a communication path or storage location of the data point, which can be used by the on-premise agent device 302 to locate and retrieve the data point value; a priority value associated with the data point; a classification of the data point; or other such information. Other fixed properties defined in asset model 224 can include any of the information to be packaged in header 604 when data collected from the mobile asset is to be transmitted to the cloud platform by agent device 302 (e.g., a customer ID for the asset or other such information).

Variable properties of the asset defined in the asset model 224 can include, for example, a current status of the asset (e.g., available, in maintenance, waiting for maintenance, on-site, etc.), a number of work hours remaining for the asset before the asset's schedule maintenance, a total number of accumulated work hours logged by the asset, a current location of the asset, the asset's predicted work schedule (e.g., forthcoming dates on which the asset is scheduled to be at a work site), or other such variable properties.

Returning now to FIG. 7, asset model definition component 210 can dynamically update stored asset models 224 for the respective mobile assets 702 based on asset data 704 collected from the mobile assets 702 (e.g., using techniques described above in connection with FIGS. 4-6) as well as maintenance schedule data 706 and work schedule data 708 stored on the cloud platform. Maintenance schedule data 706 defines anticipated maintenance dates or maintenance milestones for the respective assets. In some cases, maintenance schedule data 706 can define an asset's maintenance schedule in terms of a specified date or set of dates on which the asset is scheduled for preventative maintenance or repair. In other cases, the maintenance schedule data 706 can define an asset's maintenance schedule in terms of a target number of work hours (e.g., a preventative maintenance operation that is scheduled to be performed every 500 work hours logged by the asset).

Some or all of maintenance schedule data 706 can be kept up-to-date by a user using a suitable interface generated by mobile asset management system 202. For example, asset scheduling component 212 can be configured to serve one or more graphic user interfaces to authorized client devices that allow the user to enter maintenance schedule information for each mobile asset individually, or collectively for a group of related mobile assets. Asset scheduling component 212 can then store the entered maintenance schedule information as part of maintenance schedule data 706.

Work schedule data 708 can define present and forthcoming dates on which the respective assets are scheduled for deployment to a work site. As with the maintenance schedule data 706, some or all of the work schedule data 708 can be entered by a user via a suitable data entry display served to the user's client device by the mobile asset management system 202. In addition or alternatively, some or all of the work schedule data 708 can be dynamically generated by asset scheduling component 212 if dynamic asset scheduling is supported (as will be described in more detail below).

Asset data 704 (e.g., telemetry data, status data, location data, etc.) can be collected from the respective mobile assets 702, either using the architecture discussed above in connection with FIGS. 4-6 or via another architecture for collecting industrial asset data into the cloud platform. Relevant subsets of the asset data 704 can be used by the asset model definition component 210 to dynamically update the variable properties defined in the asset models 224. For example, asset model definition component 210 can use location tracking data (e.g., global positioning system data or other such location data) collected from the respective mobile assets 702 to update the asset models 224 to reflect each mobile asset's current location.

Asset model definition component 210 can also update the accumulated work hours for each mobile asset 702 based on the asset data 704. For example, in scenarios in which a mobile asset 702 tracks its own total number of work hours, the asset data 704 can include an explicit value of the asset's total number of logged work hours, which the asset model definition component 210 can record in the asset model 224 corresponding to that mobile asset. In addition or alternatively, some mobile assets 702 may have their total number of work hours tracked by the cloud-based mobile asset management system 202. In such scenarios, the asset model definition component 210 can maintain a log of the cumulative number of hours in which the mobile asset has been in an operational state, as determined based on operational data received as part of the asset data 704 for that asset.

Asset model definition component 210 can also record the current status of each mobile asset in the respective asset models 224 based on one or more of the asset data 704, maintenance schedule data 706, and the work schedule data 708. In some scenarios the asset model definition component 210 may derive a mobile asset's current status based on the work schedule and maintenance schedule defined for the asset in the work schedule data 708 and maintenance schedule data 706, respectively. For example, if the work schedule data 708 for a mobile asset indicates that the asset has been scheduled for on-site operation on the present date, the asset model definition component 210 can update the asset model 224 for the asset to indicate that the mobile asset is currently in operation. If the maintenance schedule data 706 indicates that the asset has been scheduled for maintenance on the present date, the asset model definition component 210 can update the asset model 224 for the asset to indicate that the asset is currently out of service for maintenance.

The recorded status of a mobile asset can also be set based in part on operational or status information received via the asset data 704. For example, a mobile asset may report, via asset data 704, a fault condition that must be corrected before the asset can be placed back in service (e.g., a low coolant fault, a high operating temperature fault, etc.). Accordingly, based on this reported alarm condition, the asset model definition component 210 can update the asset model 224 for the asset to indicate a FAULTED state.

In some scenarios, the status of a mobile asset can be based on an aggregation of information from two or more of the maintenance schedule data 706, the work schedule data 708, and the asset data 704. For example, if a preventative maintenance schedule for an asset indicates that the asset should be serviced every 200 work hours, and the accumulated work hours recorded for the asset (determined based on telemetry data received from the asset, as described above) indicates that the asset has reached this 200 work hour milestone (that is, the asset has worked 200 hours since its previous maintenance operation), the asset model definition component 210 can update the asset model 224 for the asset to indicate that the asset is out of service until the requisite preventative maintenance is performed on the asset. In some embodiments, the asset model 224 for an asset having a work-hours-based preventative maintenance schedule can be dynamically updated to indicate the number of work hours remaining until the asset reaches its next scheduled preventative maintenance milestone (e.g., based on the difference between the target number of work hours and the number of work hours logged since the previous maintenance operation was performed on the asset). This number represents the mobile asset's life span.

Asset model definition component 210 can also record predicted future work schedules for the mobile assets based on the work schedule data 708. In some embodiments, the predicted work schedule recorded in the asset model 224 can comprise an indication of future dates on which the asset is scheduled to be deployed to a work site. This information can be used by the system 202 in connection with dynamic scheduling of the mobile assets, as will be described in more detail below.

Information about the mobile assets 702 recorded in the asset models 224 is not limited to the types of information described above, and it is to be appreciated that other types of information about the mobile assets can be included in the models 224 without departing from the scope of one or more embodiments of this disclosure.

Figure 9:
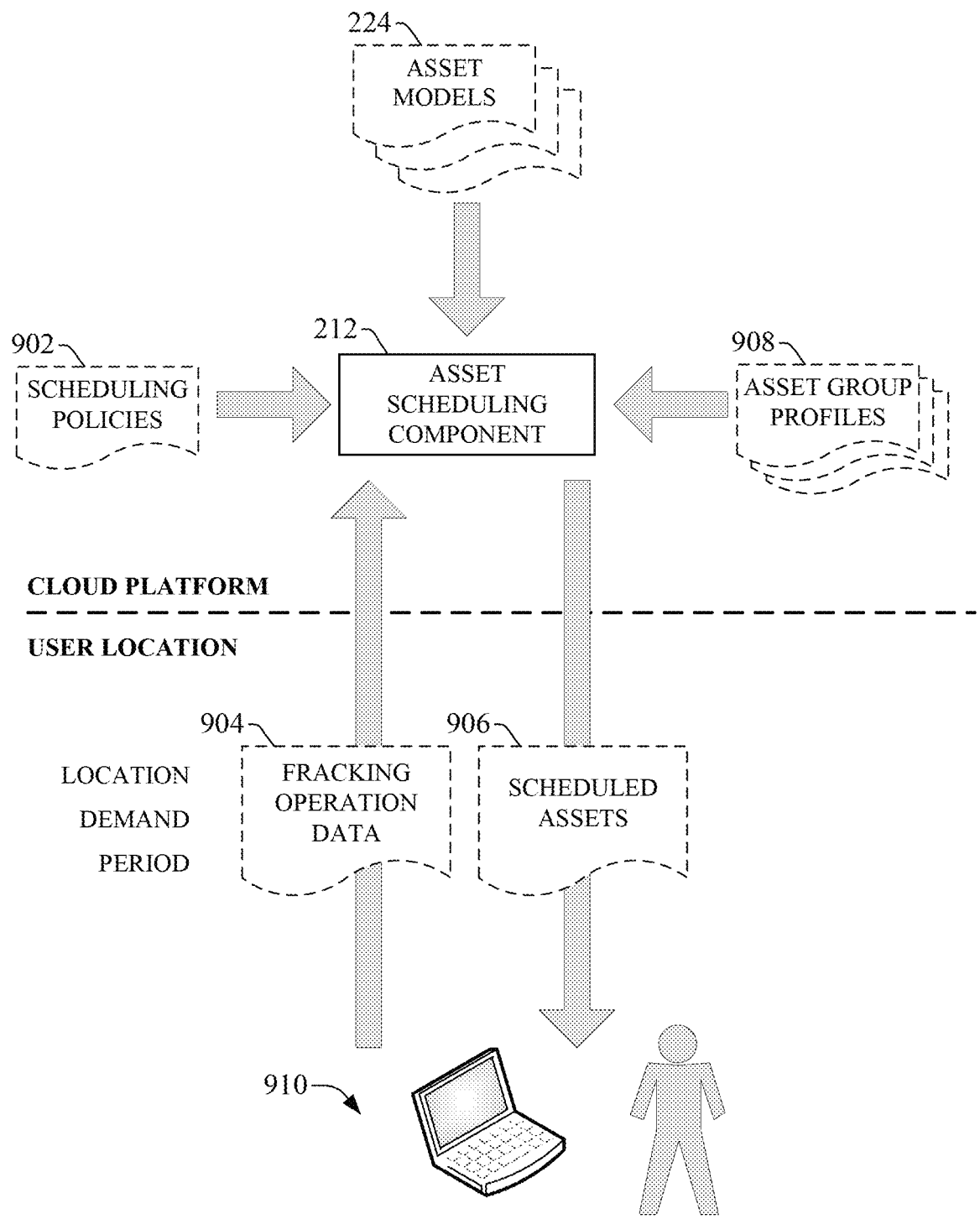
FIG. 9 is a diagram illustrating dynamic scheduling of mobile industrial assets.

As noted above, some embodiments of the cloud-based mobile asset management system 202 support dynamic scheduling of mobile assets for industrial operations at one or more work sites. FIG. 9 is a diagram illustrating dynamic scheduling of mobile industrial assets. Mobile asset management system 202 includes an asset scheduling component 212 configured to dynamically assign a selected subset of available mobile assets to a scheduled industrial operation based on requirements of the industrial operation, availabilities and capacities of the mobile assets (as determined based on information in the asset models 224), and user-defined scheduling policies 902 stored on the cloud platform. In some embodiments, asset scheduling comment 212 can also factor asset group metrics recorded in an asset group profile 908, as will be described in more detail below.

In the present example, the industrial operation to be scheduled is a fracking operation. However, embodiments of the mobile asset management system 202 can dynamically schedule assets for substantially any type of industrial operation that relies on mobile industrial assets selected from a pool of such assets, including but not limited to mining operations, power distribution operations, etc.

A user can remotely interface with the mobile asset management system 202 using a suitable graphical interface served by the system to the user's client device 910. The graphical interface can allow the user to enter specifics of the forthcoming fracking operation as fracking operation data 904. Fracking operation data 904 can specify demand requirements for the operation, and based on this information, asset scheduling component 212 can select a subset or cluster of mobile assets capable of satisfying the demand requirements.

In an example scenario, fracking operation data 904 can define a location of the operation, a demand required by the operation, and a period for the operation. The fracking operation data 904 can define the location in terms of a geographic location, or in terms of a work site identifier that can be cross-referenced by the asset scheduling component 212 to identify the geographic location. The demand represents one or more functional demands that will be required by the operation (e.g., an amount of water or chemicals that will be required in order to carry out the operation, a total required pumping capacity, etc.). For some operations, the demand may be defined as a list of sub-operations that comprise the total industrial operation, with a corresponding demand defined for each sub-operation. This list of sub-operations and corresponding functional demands makes up a demand matrix for the overall operation, which is to be fulfilled using a set of mobile assets that, collectively, are capable of satisfying all requirements defined in the demand matrix. The period represents a time period during which the fracking operation is to be carried out. Fracking operation data 904 can define the period in terms of a date, a range of dates, or a start date and an expected duration of the operation.

It is to be appreciated that fracking operation data 904 is not limited to definition of the particular items of information discussed above, and that other indicators of an industrial operation demand can be defined as part of fracking operation data 904 without departing from the scope of one or more embodiments of this disclosure.

Based on a correlation of the fracking operation data 904 with the capacity and availability information defined by asset models 224, asset scheduling component 212 selects a subset of the available mobile assets 702 that are both available for deployment during the operation period defined by fracking operation data 904 and that collectively satisfy the demand requirements for the operation defined by the fracking operation data 904. For example, asset scheduling component 212 can limit the total pool of available mobile assets to those that are not scheduled to be in maintenance or to be at another work site during the period of the fracking operation (as determined based on the predicted work schedule and status recorded in the asset models 224 for the respective assets), and are therefore expected to be available during the operation period. For a mobile asset that is currently at the end of its maintenance lifespan and is awaiting a maintenance operation, the asset scheduling component 212 can determine, based on the maintenance schedule data 706, whether the asset is expected to receive its preventative maintenance servicing prior to the operation period. If so, the asset can be assumed to be available for the period and will be considered eligible for deployment for the operation.

From this filtered or reduced set of mobile assets expected to be available during the operation period, the asset scheduling component 212 can select a combination of mobile assets that will meet the required operation demands defined in the demand matrix for the operation. In some instances, there may be multiple possible combinations of mobile assets capable of satisfying the demands of the forthcoming operation. In such cases, asset scheduling component 212 can select a set of assets from the multiple possible sets based on defined selection criteria. Such selection criteria can be defined as scheduling policies 902, which apply default and/or user-defined conditions on selection of mobile assets. Scheduling policies 902 may include global policies that are to be applied to all industrial operations, or operation-specific policies that are to apply only to an operation currently being scheduled. In general, scheduling policies 902 define criteria for resolving scenarios in which multiple sets of available mobile assets are capable of satisfying the demand of the industrial operation (e.g., fracking operation) being scheduled.

An example scheduling policy may specify that the asset scheduling component 212 is to minimize the number of mobile assets that are deployed to the work site (e.g., which may cause the asset scheduling component 212 to select a single large capacity truck to satisfy a demand rather than two smaller capacity trucks capable of collectively satisfying the demand). Another example scheduling policy may specify that a set of available assets should be selected from multiple possible sets of assets on the basis of lowest operating cost, greatest efficiency, lowest energy consumption, or other such criteria. In connection with determining costs, energy consumption, or efficiency of each possible group of mobile assets, the asset scheduling component 212 can consider the current (or expected) geographical location of each mobile asset relative to the location of the work site, factoring in the costs—in terms of fuel consumption, time expended, life span costs, etc.—of transporting the mobile assets to the work site.

Some embodiments of the asset scheduling component 212 can also select a suitable collection of mobile assets based on historical performance metrics recorded in asset group profiles 908 for respective different groupings of mobile assets generated by asset profile metrics component 216. Generation of such asset group profiles is described in more detail below in connection with FIG. 15.

When asset scheduling component 212 has identified a presumed optimal subset of available mobile assets capable of satisfying the demands set forth by fracking operation data 904, information identifying the selected group of mobile assets is output as scheduled assets data 906. In the illustrated example, scheduled assets data 906 is delivered to the user's client device 910 for review. However, in some embodiments that support automatic asset scheduling, the scheduled assets data 906 can be sent to a mobile asset scheduling system (e.g., a cloud-based system or a system that executes on a local server having communicative access to the mobile asset management system 202), which automatically assigns the selected mobile assets to the industrial operation. In such embodiments, the asset model definition component 210 can automatically update the asset models 224 for the selected mobile assets to change the statuses of those assets to reflect the assets will be on-site and in operation during the period defined by fracking operation data 904.

Figure 10:
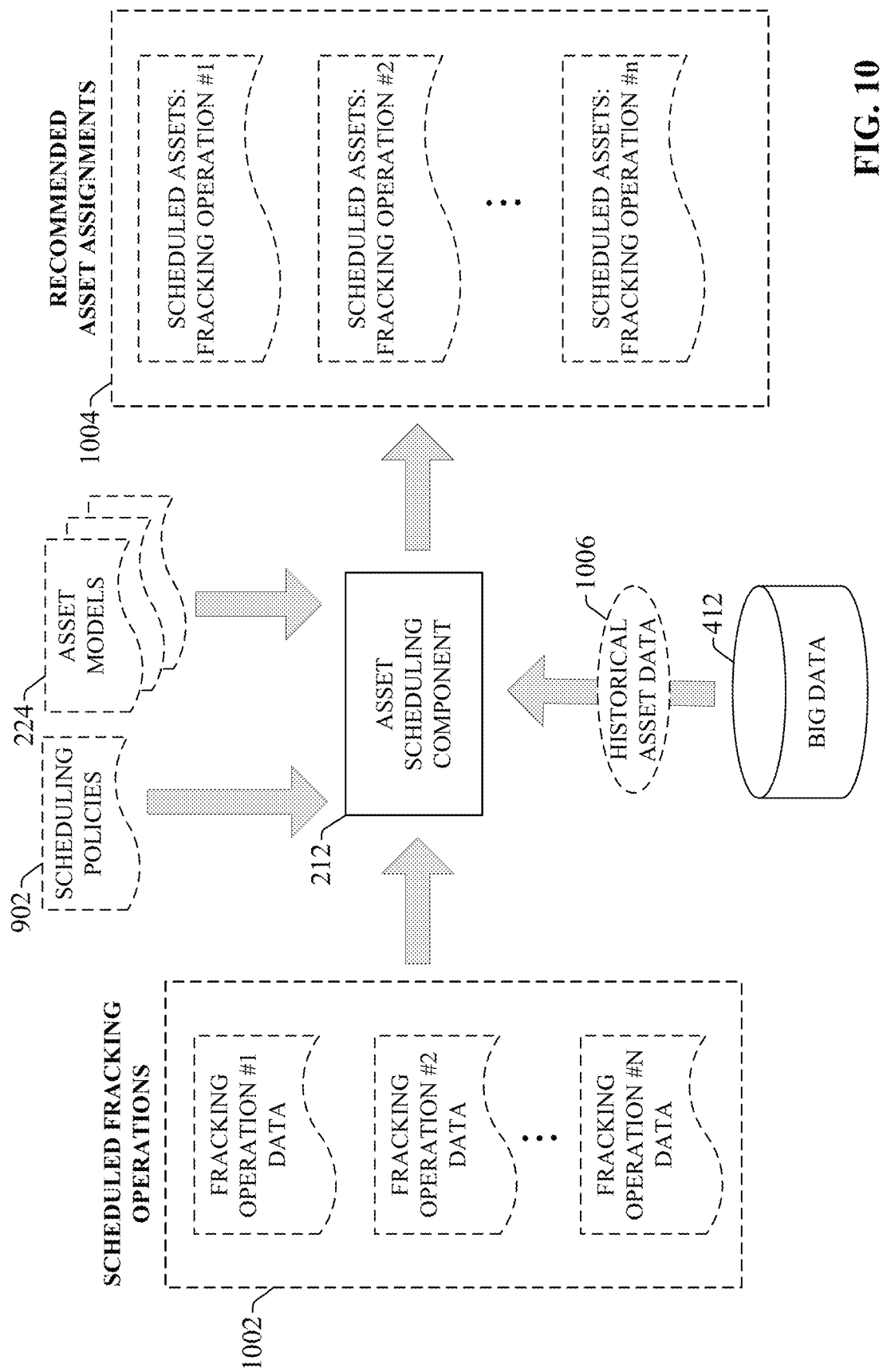
FIG. 10 is a diagram illustrating management of mobile industrial asset assignments for multiple scheduled fracking operations.

For clarity, the example illustrated in FIG. 9 depicts a scenario in which a grouping of mobile assets is selected to satisfy a defined demand for a single fracking operation. However, asset scheduling component 212 can dynamically manage mobile asset assignments for multiple scheduled industrial operations simultaneously. FIG. 10 is a diagram illustrating management of mobile industrial asset assignments for multiple scheduled fracking operations. In this example, multiple sets of fracking operation data 1002 (similar to fracking operation data 904) are provided to the mobile asset management system 202. The sets of fracking operation data 1002 define locations, periods, and demands for respective fracking operations. Based on the particulars of the respective fracking operations defined by fracking operation data 1002, the asset models 224, and scheduling policies 902, asset scheduling component 212 schedules, for each defined fracking operation, a set of recommended mobile assets capable of satisfying the demand matrices for the respective fracking operations, and which also satisfy the availability requirements for the respective fracking operation periods. The sets of recommended mobile asset assignments are output as scheduled asset data 1004, which can be rendered on a user's client device via a graphical interface served by the mobile asset management system 202, and/or sent to a mobile asset scheduling system to dynamically schedule the selected assets for use at the respective work sites at the respective operation periods. During this dynamic asset scheduling process, status information for the assigned mobile assets stored in asset models 224 is updated by asset model definition component 210 to indicate that the assets will be on-site for the periods defined by fracking operation data 1002, and will therefore be unavailable to be scheduled for other operations during those periods.

In some embodiments, selection of an optimal set of industrial assets for a given operation can also be based on historical asset data 1006 collected from the assets during previous industrial operations and stored on big data storage 412 on the cloud platform 402. Historical asset data 1006 can comprise historical telemetry data collected for the assets as the assets carried out previous industrial operations. This historical asset data 1006 can be segregated according to each individual mobile asset, and can also be classified according to the type of industrial operation being performed when the historical asset data was collected. For each industrial operation defined by fracking operation data 1002 (or data defining other types of industrial operations), asset scheduling component 212 can analyze the historical asset data 1006 for each asset that is expected to be available for the period of the industrial operation to determine a historical performance metric for the asset. More specifically, asset scheduling component 212 can analyze, for each mobile asset, a subset of that asset's historical asset data 1006 that was collected from the asset during previous industrial operations of the same type as the industrial operation currently being scheduled, and determine one or more performance metrics for the asset relative to the type of industrial operation based on results of the analysis. The performance metrics can include, but are not limited to, an efficiency of the asset (e.g., a pumping efficiency), an operating cost associated with the asset, a total energy consumption or energy consumption rate of the asset, a performance speed of the asset, or other such metrics. These performance metrics are indicative of an anticipated performance of the asset if the asset were to be placed into service to assist in performing the scheduled industrial operation.

In some embodiments, asset scheduling component 212 can determine these expected performance metrics for multiple assets that are eligible for servicing the scheduled industrial operation, and further assess various combinations of eligible assets in order to determine an optimal set of available assets capable of satisfying the demands of the scheduled asset while achieving a best performance metric. To this end, asset scheduling component can evaluate multiple sets of eligible industrial assets capable of satisfying the demands of the scheduled operation, assessing—for each set of eligible assets—the individual performance metrics of the assets that make up the set in addition to the asset models 224 for the assets (and in view of scheduling policies 902). Based on results of this analysis on multiple permutations of eligible mobile assets, asset scheduling component 212 can determine which one of the evaluated sets of assets is expected to achieve a best performance in connection with carrying out the industrial operation, based on expected individual asset performance (as determined based on each asset's historical performance inferred from historical asset data 1006).

In addition or as an alternative to this assessment of individual asset performance, some embodiments of mobile asset management system 202 can also record historical performance metrics for groups of assets collectively, and schedule groups of assets for future industrial operations based on historical performance of the group in the context of a given type of industrial operation. This technique is described in more detail below in connection with FIG. 15.

Since mobile asset management system 202 supports dynamic, just-in-time scheduling of mobile assets, asset scheduling component 212 can respond automatically to changes to either the details of the forthcoming fracking operation or the availability of one or more of the scheduled mobile assets. For example, if fracking operation data 1002 is updated to reflect a change of date for the fracking operation period, or a change of demand required by one of the fracking operations, asset scheduling component 212 can re-evaluate the new periods or demands defined by the fracking operation data 1002 and re-assign mobile assets as needed. This may involve, for example, determining whether the same previously scheduled assets are available during the new operation period or are capable of satisfying the modified demand, as well as determining whether the same previously scheduled assets still satisfy the defined scheduling policies 902 (e.g., in terms of efficiency, energy consumption, cost, etc.). If the previously scheduled assets are not available, insufficient to satisfy demand, or do not satisfy the scheduling policies 902 given the updated specifics of the modified fracking operation, asset scheduling component 212 will re-evaluate the modified fracking operation together with the asset models 224 and identify a different grouping of available mobile assets that satisfy the new requirements. In some embodiments, asset scheduling component 212 may also perform a re-evaluation of all scheduled fracking operations defined by fracking operation data 1002 in order to ensure that an overall scheduling policy remains satisfied. Also, in some embodiments, this overall re-evaluation may be performed even if the previously scheduled mobile assets for the modified fracking operation are still sufficient to satisfy the demands and timing of the modified operation, in order to determine if different groupings of assets may better satisfy an overall scheduling policy given the modified fracking operation demands.

In another example of dynamic rescheduling, one or more scheduled mobile assets may become unexpectedly unavailable due to an updated maintenance schedule or an unexpected asset failure. If the status or availability of a scheduled mobile asset—as determined by the asset model 224 corresponding to the asset—is updated in a manner that renders the asset incapable of participating in its scheduled fracking operation, asset scheduling component 212 will re-evaluate the operation and the remaining available assets in order to determine a new group of mobile assets capable of fulfilling the operation's demand during the scheduled period. This rescheduling may involve simply replacing the unavailable asset if doing so ensures that the scheduling policy (e.g., least energy, least time, most efficient, least cost, etc.) remains satisfied. Alternatively, the asset scheduling component 212 may determine that other mobile assets that were previously scheduled for the operation must also be replaced in order to ensure that the criteria defined by the scheduling policies 902 remains satisfied.

For a given industrial operation, the group of mobile assets scheduled to carry out the operation can be re-negotiated any number of times prior to the beginning of the operation (e.g., in the event of an unexpected availability of a scheduled mobile asset, a change in the expected demand of the operation, etc.). After the mobile assets have been deployed to the location of the operation (e.g., a fracking station or other work site), the on-premise agent device 302 located at the work site can dynamically generate manifest data for configuring collection of status and telemetry data from the particular mobile assets deployed to the work site.

Figure 11:
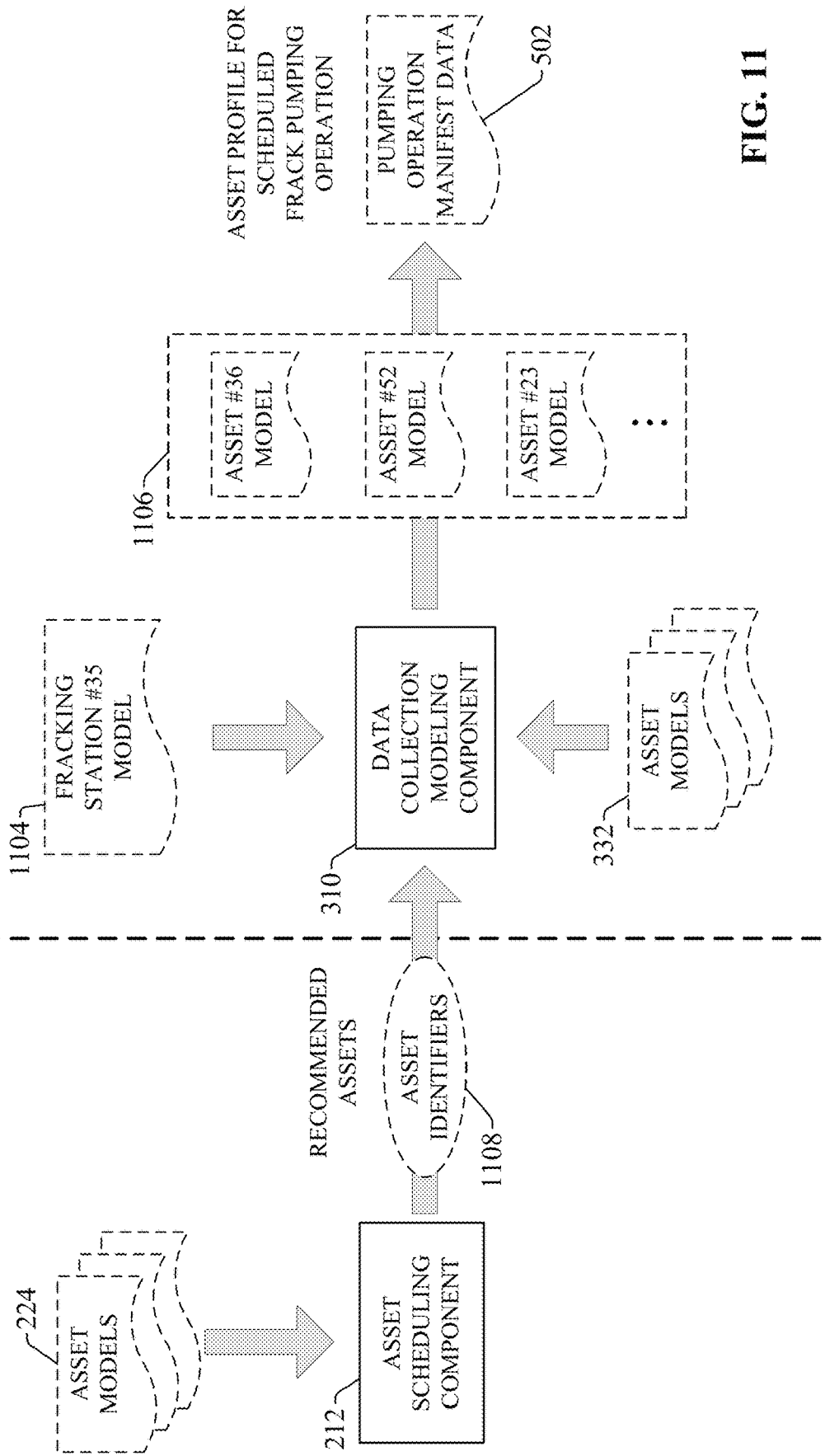
FIG. 11 is a diagram illustrating generation of manifest data used to configure data collection for a frack pumping operation.

FIG. 11 is a diagram illustrating generation of manifest data 502 used to configure data collection for a frack pumping operation. In this example, asset scheduling component 212 of mobile asset management system 202 has selected a subset of available mobile assets for the frack pumping operation, as described in previous examples. In some embodiments, on-premise cloud agent device 302 is also provisioned with a library of asset models 332 (similar to asset models 224 stored on mobile asset management system 202) corresponding to the mobile industrial assets that are capable of being deployed to the work site being monitored by the cloud agent device 302. At the time of the industrial operation, and based on the identities of the mobile assets selected for the present industrial operation, data collection modeling component 310 of the on-premise cloud agent device retrieves the subset of asset models 1106 from the library of asset models 332 corresponding to the selected assets, and generates pumping operation manifest data 502 for the current pumping operation. Pumping operation manifest data 502 represents an asset profile for the current frack pumping operation, and includes data—obtained from the selected asset models 1106—that identifies available telemetry data points for each selected mobile asset and that instructs the agent device 302 how or where to obtain the values of these data points.

For example, for a given data point, the manifest data 502 may identify a communication path to a data storage device associated with the industrial asset (e.g., a controller, a motor drive, an on-board historian, etc.) and an identity of a data tag on the device containing the value of the data point. Manifest data 502 may also define other communication parameters for the respective data points, including but not limited to an upload frequency (which may be based on a priority or an importance level associated with the data point), an identity of a priority queue 404 on the cloud platform to which the data point is to be sent, or other such information. Manifest data 502 can also identify an analytic application or algorithm to be applied to the data point by the cloud-based asset management system 202.

In some embodiments, data collection modeling component 310 can generate manifest data 502 further based on a fracking station model 1104 stored on the agent device 302. Fracking station model 1104 can include information relating to the particular fracking station at which the on-premise agent device 302 resides, including a customer identifier, a site identifier, and any fixed telemetry at the station that is to be collected together with the mobile asset telemetry defined by the asset models 1106.

In some embodiments, data collection modeling component 310 can select and retrieve the appropriate subset of asset models 1106 for creation of pumping operation manifest data 502 based on asset identifier data 1108 sent to the cloud agent device 302 from the mobile asset management system 202, the asset identifier data 1108 identifying mobile assets that will be participating in the frack pumping operation. This asset identifier data 1108 can take the form of a message sent to the on-premise agent device 302 from mobile asset management system 202 via a communication channel between the on-premise agent device 302 and the cloud platform. Based on the identities of the mobile assets contained in the asset identifier data 1108, data collection modeling component 310 can retrieve the subset of asset models 1106 corresponding to the identified assets and generate the manifest data 502 based on information contained in the asset models 1106 (as well as station model 1104 in some embodiments). Alternatively, rather than storing asset models 332 on cloud agent device 302, in some embodiments the mobile asset management system 202 can send the subset of asset models 224 to the cloud agent device 302, which can then be used by data collection modeling component 310 to configure manifest data 502.

In yet other alternative embodiments, data collection modeling component 310 can generate manifest data 502 based on the actual mobile assets that have physically arrived at the work site and subscribed to agent device 302 for the present pumping operation. In such embodiments, mobile assets that have arrived at the fracking station can communicatively connect to an asset subscription point device, which may be the on-premise agent device 302 itself or another device that interfaces with the agent device 302. Each asset can then send an identification notification to the asset subscription point identifying the asset so that the corresponding asset model can be selected and included in manifest data 502.

For cloud-based data collection systems generally conforming to the architecture described above in connection with FIGS. 4-6, on-premise agent device 302 can also upload some or all of on-premise manifest data 502 to the mobile asset management system 202 residing on the cloud platform. The manifest assembly component 208 of mobile asset management component can generate cloud-side manifest data 406 based in part on manifest data 502 generated and uploaded by agent device 302, and store the manifest data 502 in a customer-specific manifest assembly 434 (see FIG. 4). Alternatively, manifest assembly component 208 of mobile asset management system 202 can generate the manifest data 406 based on the subset of asset models 224 selected for the present industrial operation. During data collection, queue management component 204 can refer to manifest data 406 to determine destination priority queues 404 or cloud-side storage locations for the collected data items, analytic applications or algorithms to be applied to the data items, or other such data management functions.

In some embodiments, the selection of data points to be collected from the mobile or fixed assets can also be determined in part by a self-learning engine deployed on the assets themselves. In an example scenario, this self-learning engine can reside on a controller associated with the asset and can be configured to identify a subset of the asset's available telemetry to be collected based on a defined high-level analytics goal. For example, a user may wish to monitor the life of oil in a pumping truck (one of the mobile assets). Accordingly, the user can enter this request via a graphical interface served by the mobile asset management system 202, which conveys this request—via agent device 302—to the self-learning engine executing on the controller associated with the truck. Based on this request, the self-learning engine determines a subset of the asset's available telemetry that should be collected in order to carry out the requested oil life monitoring. In some embodiments, the self-learning engine can also determine a minimum upload frequency for the selected subset of telemetry points based on the nature of the defined analytics goal. The self-learning engine can convey the identities of the selected telemetry points to the data collection monitoring component 310 (via agent device 302), which can update the manifest data 502 accordingly.

In some embodiments that employ a self-learning engine, the self-learning engine can comprise a plugin module that installs on the backplane of the asset's control system. In such embodiments, the self-learning engine can receive streaming data from the asset's controller(s), and perform analytics on the data to determine which telemetry points are necessary to facilitate the requested high-level analytics goal. In other embodiments that use a self-learning engine, the self-learning engine may be part of a multicore controller, where one of the cores is designated for data management carried out by the self-learning engine.

Also, in some embodiments, the self-learning engine embedded at the controller level can work in collaboration with higher-level learning modules implemented on edge devices (e.g., agent device 302) or on cloud platform 402. In such embodiments, each higher level self-learning engine can concentrate knowledge of the engine's subsystems under analysis, including learning modules and operational assets, forming a dynamic semi-hierarchical structure of analytics and learning nodes.

Figure 12:
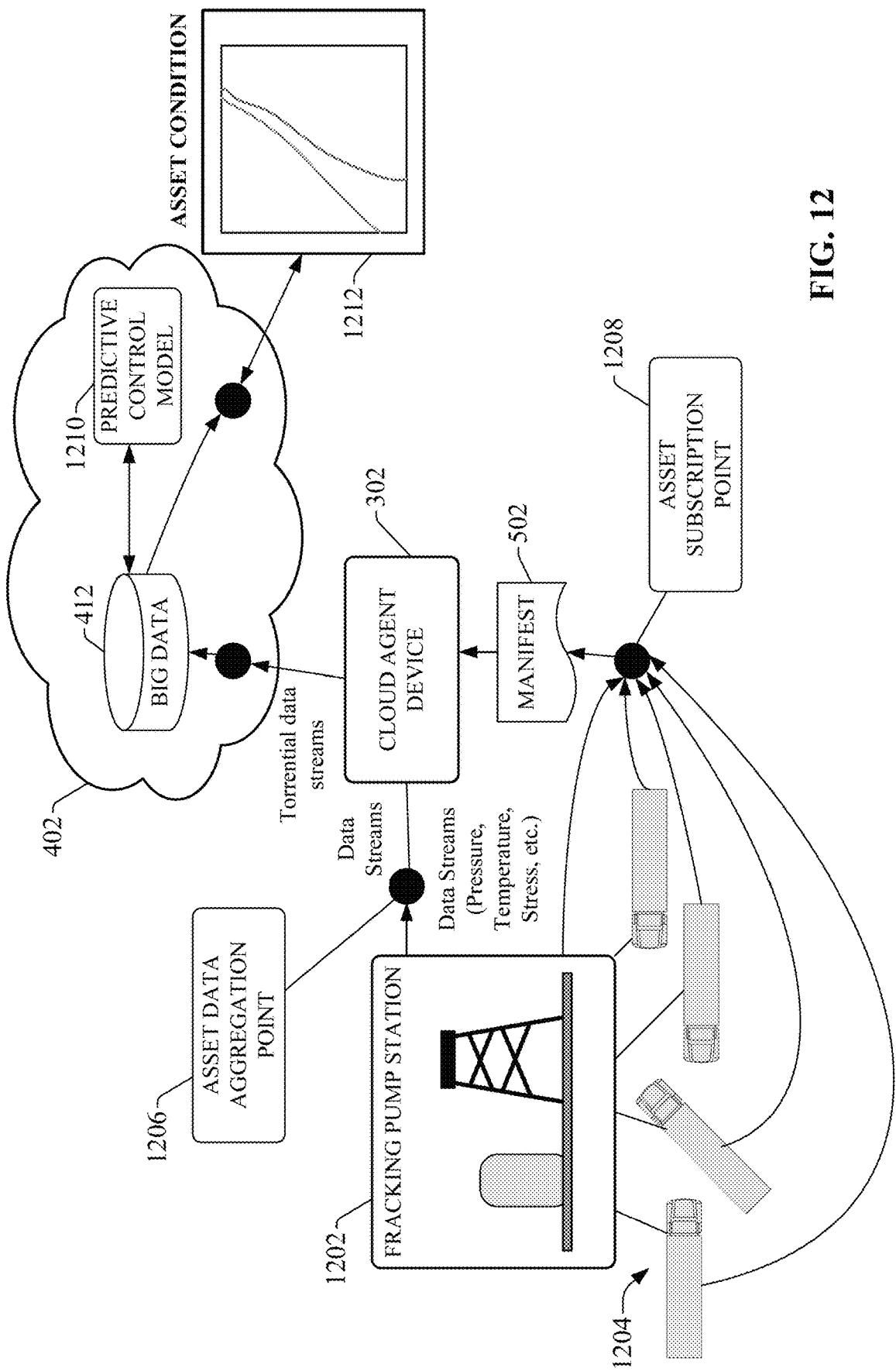
FIG. 12 is a diagram of a generalized data collection architecture for a fracking pump station comprising multiple mobile assets.

FIG. 12 is a diagram of a generalized data collection architecture for a fracking pump station comprising multiple mobile assets. In this example, mobile assets 1204 have been selected for the present frack pumping operation by mobile asset management system 202, and have registered with asset subscription point device 1208 (which may be a component of agent device 302 or a separate device). Based on the registered identifications of the mobile assets 1204, manifest data 502 is generated based on the asset profiles for the respective mobile assets 1204 and the station model for fracking pump station 1202. Manifest data 502 is used to configure on-premise agent device 302 to collect data for the present pumping operation. This includes identifying, to the agent device 302, the telemetry data points available for collection from the mobile assets 1204, as well as any communication and processing parameters associated with the data points or mobile assets 1204. Some or all of manifest data 502 can also be uploaded to the cloud platform 402 for storage in the customer-specific manifest assembly 434 (not shown in FIG. 12).

After manifest data 502 has been configured for the present pumping operation, agent device 302 begins collecting data from both fixed industrial assets at pump station 1202 (e.g., on-premise industrial controllers, motor drives, sensors, telemetry devices, etc.) as well as mobile industrial assets 1204. As described above in connection with FIG. 5, agent device 302 can package and send the collected data to the cloud platform 402 as one or more torrential data streams. In some implementations, data from the fixed and mobile industrial assets can be concentrated at an asset data aggregation point device 1206, which may be the agent device 302 itself or a separate data concentrator that is communicatively connected to the agent device 302 and which serves to concentrate data from the diverse sources to a single data pipe for collection and processing by the agent device 302.

As noted above, the cloud-based asset management and data collection system can include an analytic engine 418 (implemented by analysis component 214) capable of performing custom analysis on data collected from the fixed and mobile industrial assets. Such analysis can include, for example, alarm analytics that monitor specific data items during the pumping operation and generate alarms in response to determining that the data items have fallen outside a defined acceptable range. Such alarm analytics can monitor operational data generated by the assets (e.g., gas flows, output rates, fill levels, etc.) to ensure that the pumping operation is performing as expected, as well as asset status data points relating to the health of the assets themselves (e.g., temperatures, pressures, stress levels, etc.)

In another example, analytic engine 418 can carry out predictive analytics on the collected data. This can include analyzing trends in values of data items indicative of the health or performance integrity of an asset (e.g., pump vibration frequencies, asset operating temperatures, motor coolant levels and temperatures, flow rates, noise levels, etc.), and generating predictions of the near-term and long-term health of the asset based on a correlation of these trends with a predictive control model 1210 stored on the cloud platform and maintained by analysis component 214. Predictive control model 1210 can define characteristic trends in health-related telemetry for various types of fixed and mobile assets. Characteristic trends defined by the predictive control model 1210 can include expected trajectories of measured data items over a maintenance cycle for the asset. Based on a comparison of historical trends of the actual data points corresponding to the health-related telemetry with the expected trends defined in predictive control model 1210, analysis component 214 can determine where, on the expected trend, the asset currently resides, and forecast future trends of these health-related parameters.

In some embodiments, analysis component 214 can render a graphical representation of these predicted future trends on a graphical interface (e.g., asset condition graphical interface 1212) served to an authorized client device. In an example embodiment, the predicted future trends can be rendered as a plot of the measured asset performance or health parameters (e.g., vibration frequencies, operating temperatures, coolant levels and temperatures, flow rates, noise levels, etc.) as a function of operating hours. The rendered presentation can also include an indication of the current number of operating hours logged for the asset. In some embodiments, analysis component 214 can also predict, based on the forecasted trends, a date on which the asset will require a maintenance service. In such embodiments, the analysis component 214 can predict the date based on the health parameter's current position on the predicted performance trend, a difference between the expected number of operating hours at which maintenance will be required (as determined based on the predicted trend) and a current number of operating hours logged for the asset (where the difference represents the number of remaining operating hours until the health parameter is expected to reach the portion of the trend signifying that maintenance will be required), and a predicted rate at which the asset is expected to log the remaining operating hours (e.g., based on average historical operating rates for the asset). It is to be appreciated that this example is only intended to be exemplary, and that other types of predictive maintenance analysis are also within the scope of one or more embodiments of this disclosure.

Figure 13:
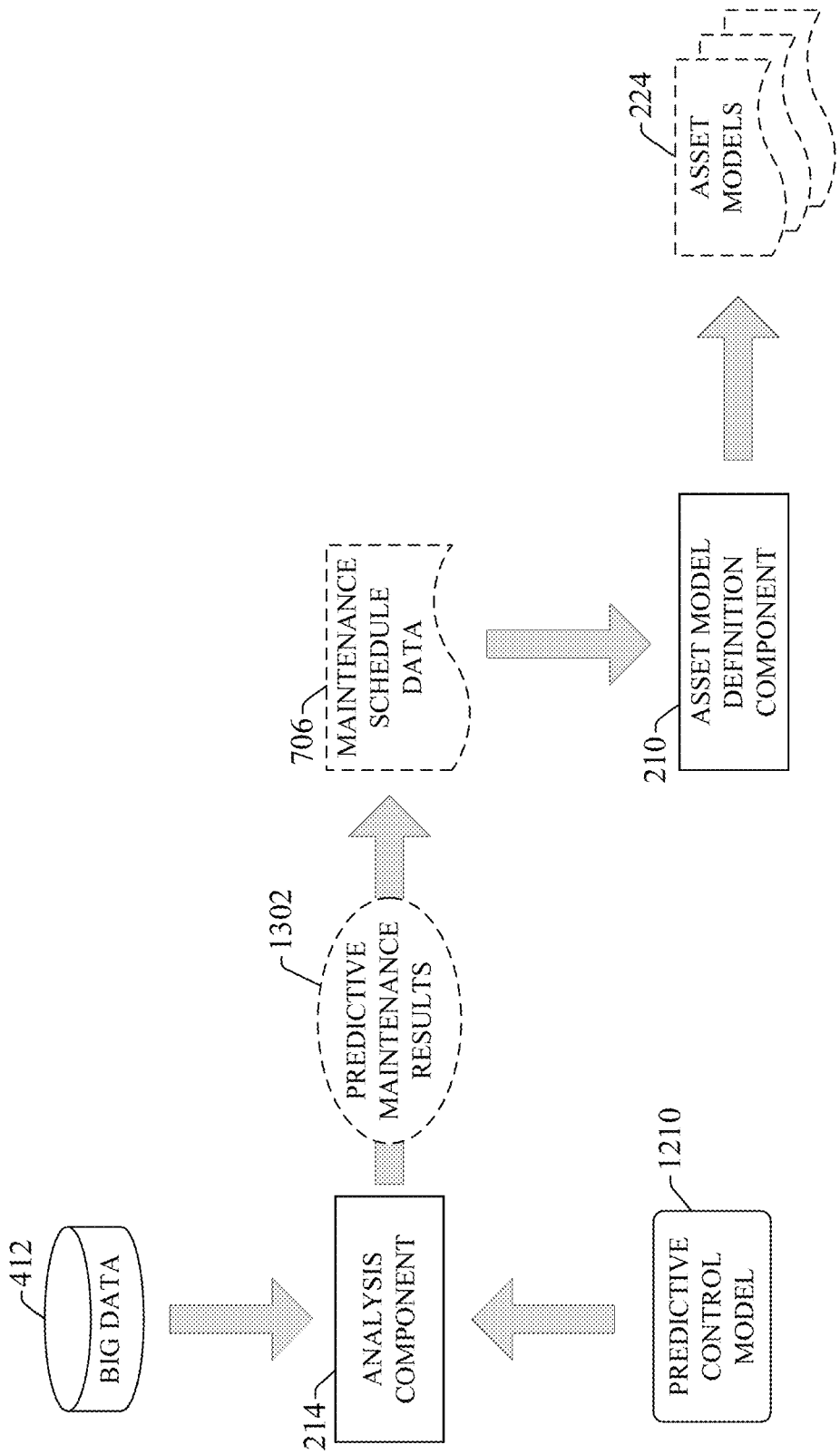
FIG. 13 is a diagram illustrating the use of predictive maintenance results to update maintenance schedule data for mobile industrial assets.

In some embodiments, results of predictive maintenance analysis can be used to update maintenance schedule data 706 for the mobile assets (see FIG. 7), and are thereby fed back to the mobile asset selection process carried out by asset scheduling component 212. FIG. 13 is a diagram illustrating the use of predictive maintenance results 1302 to update maintenance schedule data for mobile industrial assets. As described above, based on analysis of historical and current trends of performance or health parameters measured and recorded for mobile industrial assets (including correlation of the measured trends with predictive control model 1210), analysis component 214 can generate predictive maintenance results 1302 identifying predicted times—in terms of target operating hours or absolute dates—at which the assets will require maintenance. Based on these results 1302, analysis component 214 can update maintenance schedule data 706 for the relevant assets. Since the predicted times at which maintenance will be required determines when the assets are predicted to be out of service for preventative maintenance, asset model definition component 210 can record or update these predicted maintenance times in the asset models 224 for the respective assets, and asset scheduling component 212 will take these expected maintenance times into consideration when assigning mobile assets for future industrial operations (e.g., by removing from consideration any assets that are predicted to be out of service for maintenance at the time that an operation is scheduled to take place).

In some embodiments, analysis component 214 can perform predictive maintenance analysis on one or more mobile assets—and correspondingly update maintenance schedule data 706 for the assets—on a periodic basis periodically. In this way, scheduling of maintenance for mobile assets can be conducted based on actual asset condition rather than on a purely time-based schedule or on the strict basis of logged operating hours. For example, a mobile asset may be rated for preventative maintenance every 200 operating hours. However, predictive maintenance results 1302 may indicate that, based on the current trends of one or more key health or performance parameters for the asset, the asset will not require maintenance at the 200 hour mark. Rather, based on the forecasted trend for those health or performance parameters, the asset is not expected to require maintenance until the asset's $270^{th}$ operating hour. Accordingly, this maintenance schedule will be reflected in the asset model 224 for the asset, and asset scheduling component 212 will consider the asset available for selection and deployment beyond the original 200 hour mark. In this way, mobile asset management system 202 periodically or continuously re-evaluates each mobile asset's remaining maintenance lifespan based on actual measured health and performance parameters. As a result, dynamic scheduling and allocation of mobile industrial assets is based on actual asset condition rather than arbitrary fixed maintenance schedules.

Figure 14:
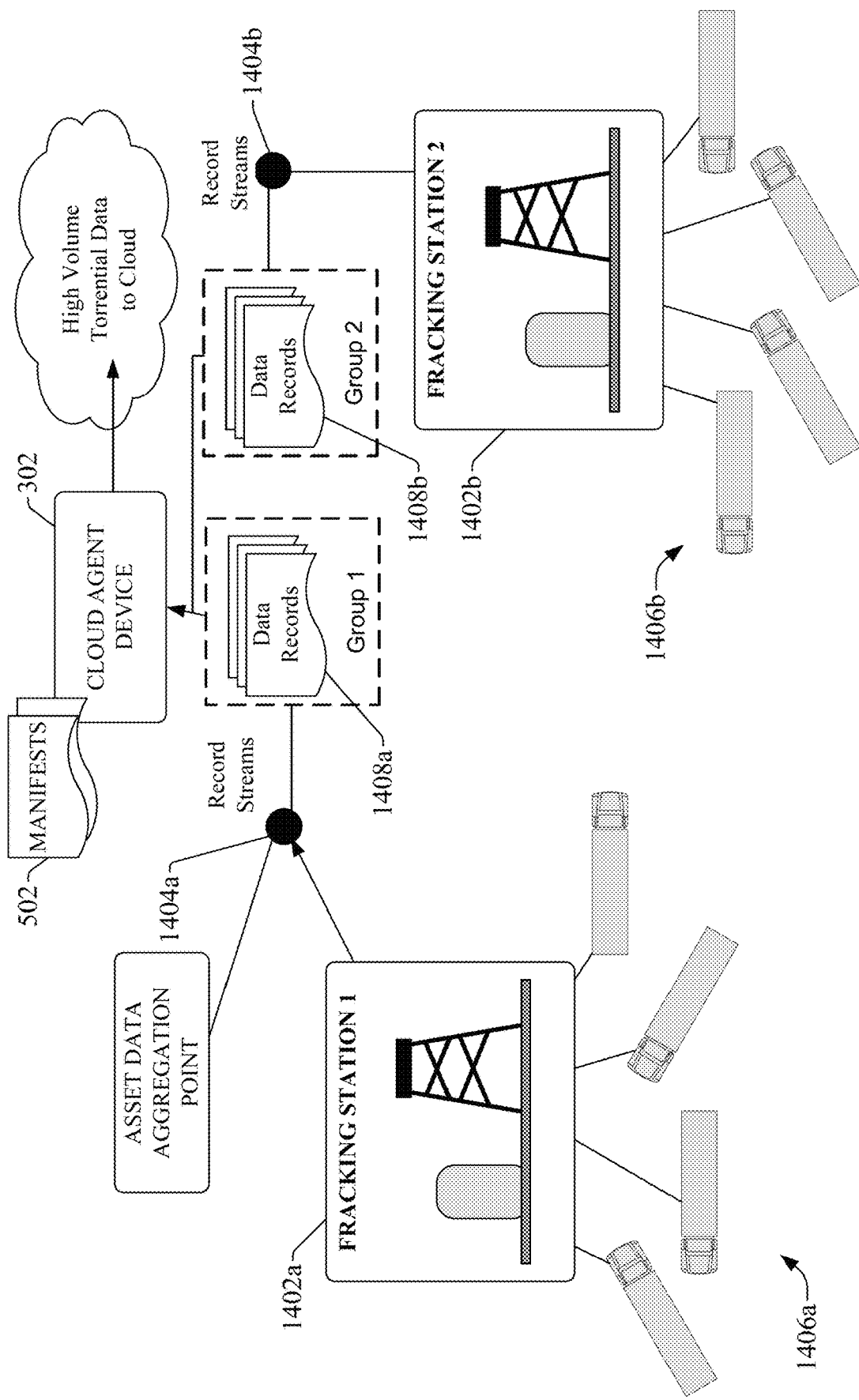
FIG. 14 is a diagram illustrating collection of data records from multiple work sites.

The dynamic asset management and data collection system described herein is scalable across multiple work sites under the purview of a given industrial enterprise. FIG. 14 is a diagram illustrating collection of data records 1408 from multiple work sites (fracking stations 1402*a* and 1402*b* in the illustrated example). In this example, a single agent device 302 provides a single data pipeline for two geographically diverse fracking stations 1402*a* and 1402*b*. While previous examples described agent device 302 as residing on-premise at a given work site at which the industrial operation is to be performed, in the illustrated example agent device 302 is located off-premise and is remotely connected to the two fracking stations 1402a and 1402b via asset data aggregation point devices 1404a and 1404b, which may be data concentrator devices located at each fracking station 1402a and 1402b that collect data from both fixed assets and mobile assets 1406a and 1406b at the respective fracking stations. Asset data aggregation points 1404a and 1404b gather and send the collected data as data records 1408a and 1408b, respectively, which are packaged by agent device 302 and pushed to the cloud platform as torrential data (e.g., as described above connection with FIG. 5, or using other data packaging and migration techniques).

Since a common agent device 302 is being used to collect and migrate data from multiple work sites in this example, multiple sets of manifest data 502 are generated and used to configure the agent device 302 to collect the necessary data at both fracking stations 1402a and 1402b. These sets of manifest data 502 are generated dynamically to reflect the sets of mobile industrial assets 1406a and 1406b at the respective fracking stations 1402a and 1402b, as described in previous examples.

Figure 15:
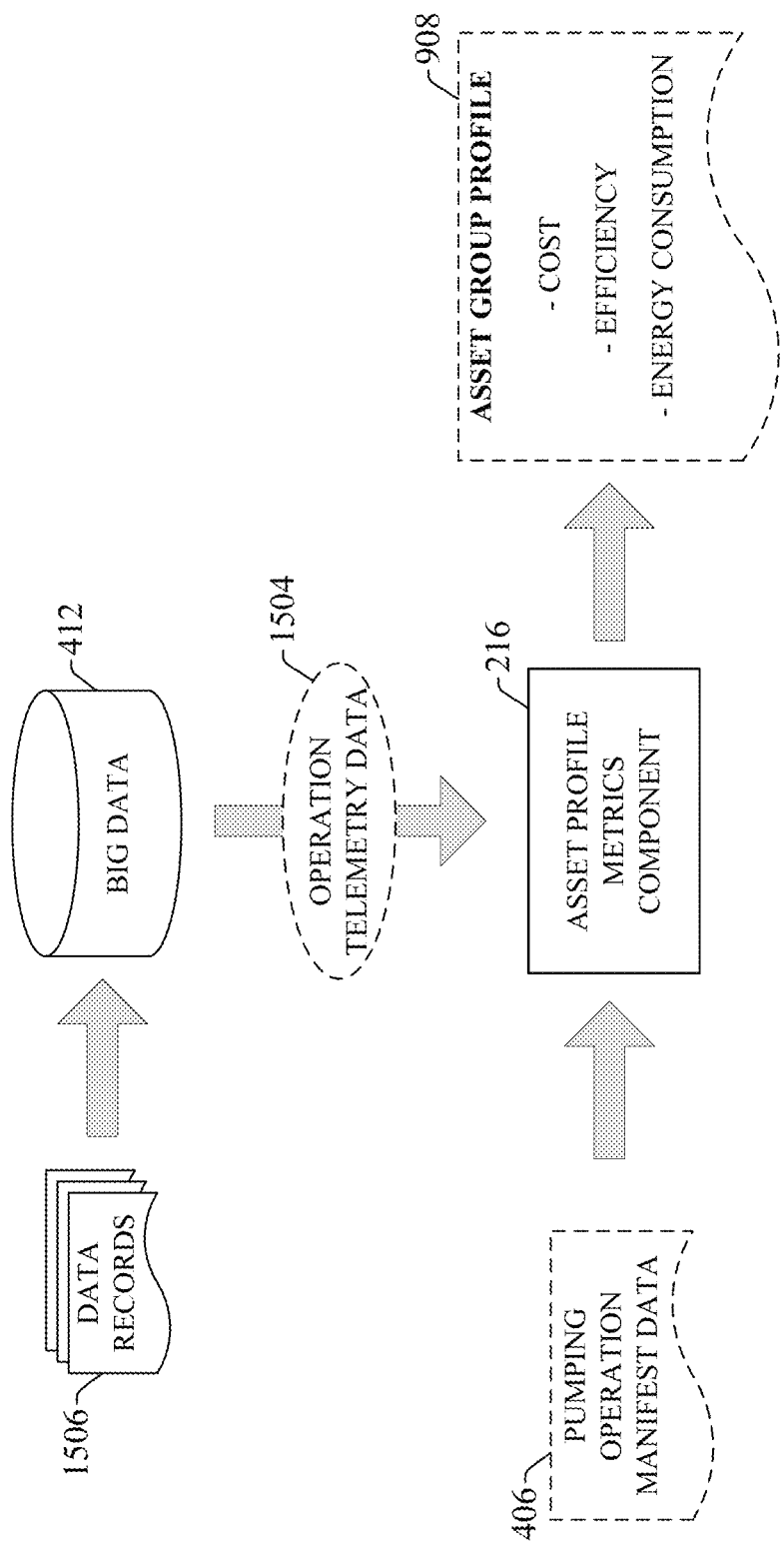
FIG. 15 is a diagram illustrating generation of mobile asset group metrics.

As noted above, some embodiments of asset scheduling component 212 can select a group of mobile assets to be assigned to a scheduled industrial operation based in part on historical performance metrics recorded for the group of assets as whole. FIG. 15 is a diagram illustrating generation of mobile asset group metrics according to one or more embodiments. In this example, cloud-side manifest data 406 has been generated based on a particular collection or grouping of mobile assets that have been assigned to a frack pumping operation by asset scheduling component 212. As such, manifest data 406 represents a mobile asset profile for the pumping operation. As the pumping operation is being carried out by the mobile assets and telemetry data is collected from the assets as data records 1506, an asset profile metrics component 216 of mobile asset management system 202 monitors a relevant subset of the collected operation telemetry data 1504 indicative of a performance of the group of assets as a whole (in addition to the individual asset monitoring carried out to predict asset health and lifespans described above). For example, asset profile metrics component can perform analytics on the operation telemetry data 1504 to determine an overall cost incurred as a result of carrying out the pumping operation using the assigned group of mobile assets, an energy or fuel consumption associated with performing the pumping operation using the group of assets, an efficiency of the pumping operation (e.g., in terms of time to completion, resource consumption, yield versus operating cost, etc.) when performed by the group of assets, or other relevant operation metrics. Asset profile metrics component 216 can record the determined operation metrics for the group of assets in an asset group profile 908, which can be stored together with similar asset group profiles for other combinations of industrial assets.

These asset group profiles 908 can be used by asset scheduling component 212 in connection with selecting a suitable group of assets to be assigned to a schedule industrial operation. For example, asset group profiles 908 can be classified according to the type of industrial operation for which the operation metrics were generated. In connection with selecting a suitable group of assets for carrying out a future scheduled operation, asset scheduling component 212 can retrieve a subset of the stored asset group profiles 908 corresponding to the type of operation being schedule, and perform a comparison of the performance metrics recorded in the respective asset group profiles 908. Asset scheduling component 212 will assign greater preference to groups of assets having most favorable recorded performance statistics (e.g., least energy consumption, highest efficiency, fastest time to completion, etc.) relative to other groups having less favorable statistics.

For example, if multiple different groupings of mobile assets capable of fulfilling the demands required by the scheduled operation are determined to be available during the scheduled period of the operation, and asset group profiles 908 corresponding to the type of the operation (e.g., a pumping operation) are available for the different groups, asset scheduling component 212 can compare the relative operation performance metrics recorded in the asset group profiles 908, and select the group having the most favorable statistics. In some embodiments, the user can define a most important criterion to be considered when selecting the group—e.g., fastest time to completion, least energy consumption, least fuel cost, etc.—and the recorded metric corresponding to this criterion will be the factor compared across the asset group profiles 908 by asset scheduling component 212.

Embodiments of the mobile asset management system 202 and agent device 302 can dynamically negotiate and schedule clusters or groups of industrial assets to satisfy the demands of multiple industrial operations (e.g., frack pumping operations or other operations that make use of mobile industrial assets) while simultaneously satisfying user-defined scheduling criteria and ensuring highly efficient asset utilization. The cloud-based architecture allows mobile asset schedules to be dynamically modified as needed in response to unexpected changes in operation times or demands, or unexpected loss of asset availability. By generating manifest data that configures data collection for the industrial operation based on the collection of mobile assets assigned to the operation, the system incrementally builds a data monitoring context that establishes data aggregation points for the operation.

In the foregoing examples, cloud platform 402 can be any infrastructure that allows cloud services (e.g., mobile asset management system 202 and associated services) to be accessed and utilized by cloud-capable devices. Cloud platform 402 can be a public cloud accessible via the Internet by devices having Internet connectivity and appropriate authorizations to utilize the cloud services. In some scenarios, cloud platform 402 can be provided by a cloud provider as a platform-as-a-service (PaaS), and the services (such as the mobile asset management system 202 described herein) can reside and execute on the cloud platform 402 as a cloud-based service. In some such configurations, access to the cloud platform 402 and associated cloud services can be provided to customers as a subscription service by an owner of the services. Alternatively, cloud platform 402 can be a private or semi-private cloud operated internally by the enterprise, or a shared or corporate cloud environment. An example private cloud can comprise a set of servers hosting the cloud services and residing on a corporate network protected by a firewall.

Other cloud services that can be executed on the cloud platform 402 can include, but are not limited to, data storage, data analysis, control applications (e.g., applications that can generate and deliver control instructions to industrial devices or assets based on analysis of real-time system data or other factors), visualization applications such as a cloud-based operator interface system, reporting applications, Enterprise Resource Planning (ERP) applications, notification services, or other such applications. Cloud platform 402 may also include one or more object models to facilitate data ingestion and processing in the cloud. If cloud platform 402 is a web-based cloud, agent devices 302 may interact with cloud services directly or via the Internet. In an example configuration, the industrial devices or assets can connect to on-premise agent devices 302 through a physical or wireless local area network or radio link. In another exemplary configuration, the industrial devices or assets may access the cloud platform 402 directly using integrated cloud agent services.

FIGS. 16-19 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 16:
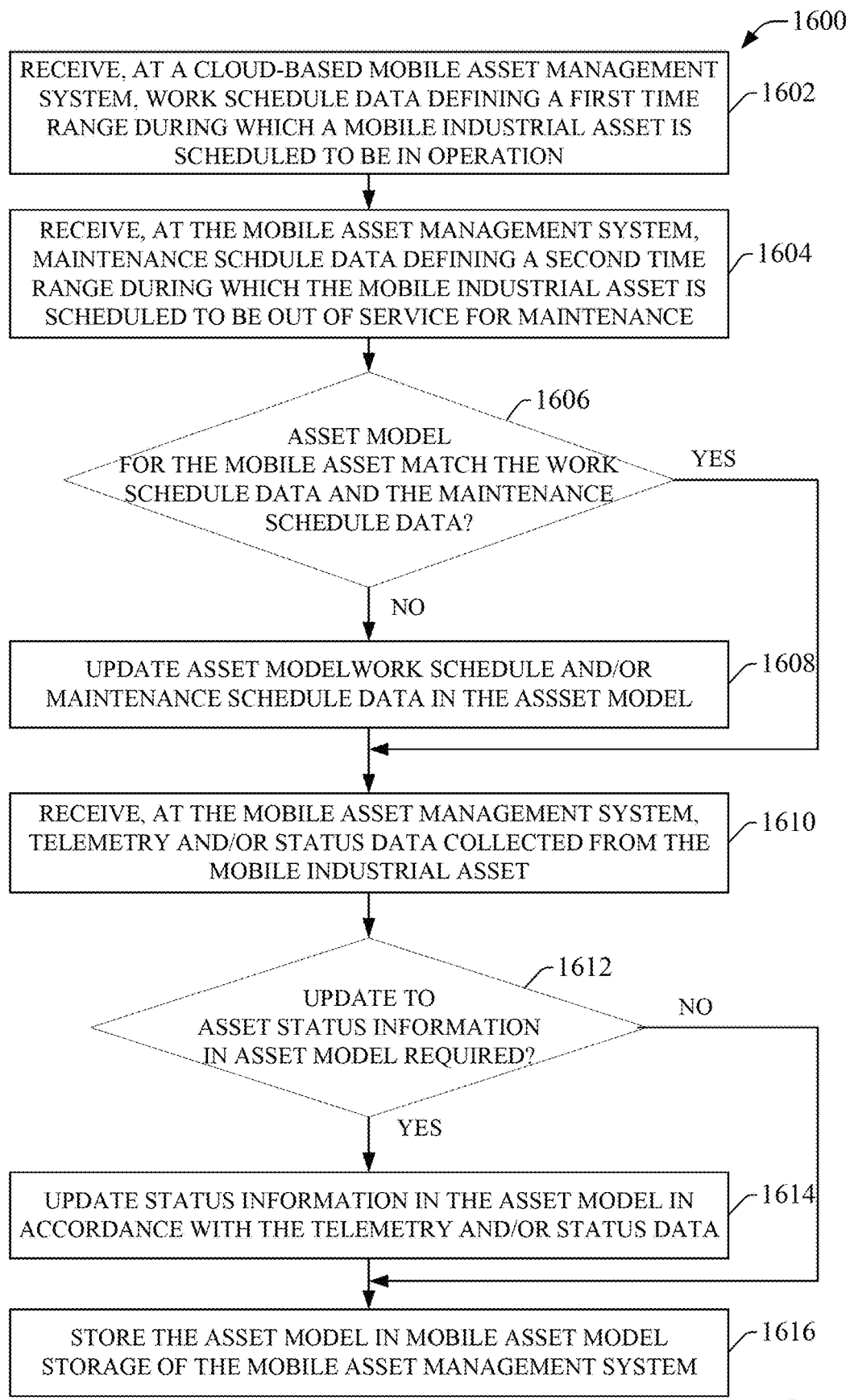
FIG. 16 is a flowchart of an example methodology for updating and storing an asset model for a mobile industrial asset.

FIG. 16 illustrates an example methodology 1600 for updating and storing an asset model for a mobile industrial asset (e.g., an industrial asset mounted on a truck or other types of mobile industrial assets). These asset models can be used by a cloud-based mobile asset management system in connection with dynamically scheduling mobile industrial assets for planned industrial operations. Initially, at 1602, work schedule data is received at a cloud-based mobile asset management system, the work schedule data defining a first time range during which a mobile industrial asset is scheduled to be in operation. At 1604, maintenance schedule data is received at the mobile asset management system, the maintenance schedule data defining a second time range during which the mobile industrial asset is scheduled to be out of service for maintenance.

At 1606, a determination is made as to whether data contained in an asset model corresponding to the mobile asset matches the work schedule data and the maintenance schedule data. If the asset model does not accurately reflect the work schedule data and the maintenance schedule data received at steps 1602 and 1604 (NO at step 1606), the methodology proceeds to step 1608, where work schedule data and/or maintenance schedule data stored in the asset model is updated based on the work schedule data and/or the maintenance schedule data received at steps 1602 and 1604. Alternatively, if the asset model accurately reflects the work schedule data and the maintenance schedule data received at steps 1602 and 1604 (YES at step 1606), the methodology proceeds to step 1610 without updating the asset model at step 1608.

At 1610, telemetry and/or status data collected from the mobile industrial asset is received at the mobile asset management system. At 1612, a determination is made as to whether an updated to asset status information recorded in the asset model is required based on the telemetry and/or status data received at step 1610. The telemetry and/or status data can reflect the asset's current location, number of work hours logged, alarm information, fault status, maintenance status, or other such information. If an update to the status information is required (YES at step 1612), the methodology proceeds to step 1614, where status information recorded in the asset model is updated in accordance with the telemetry and/or status data received at step 1610. Alternatively, if an updated to the status information in the asset model is not required (NO at step 1612), the methodology proceeds to step 1616 without performing a status information update. At 1616, the asset model is stored in mobile asset model storage associated with the mobile asset management system, which can reference the asset model in connection with selecting a suitable collection of mobile assets to be assigned to a schedule industrial operation.

Figure 17:
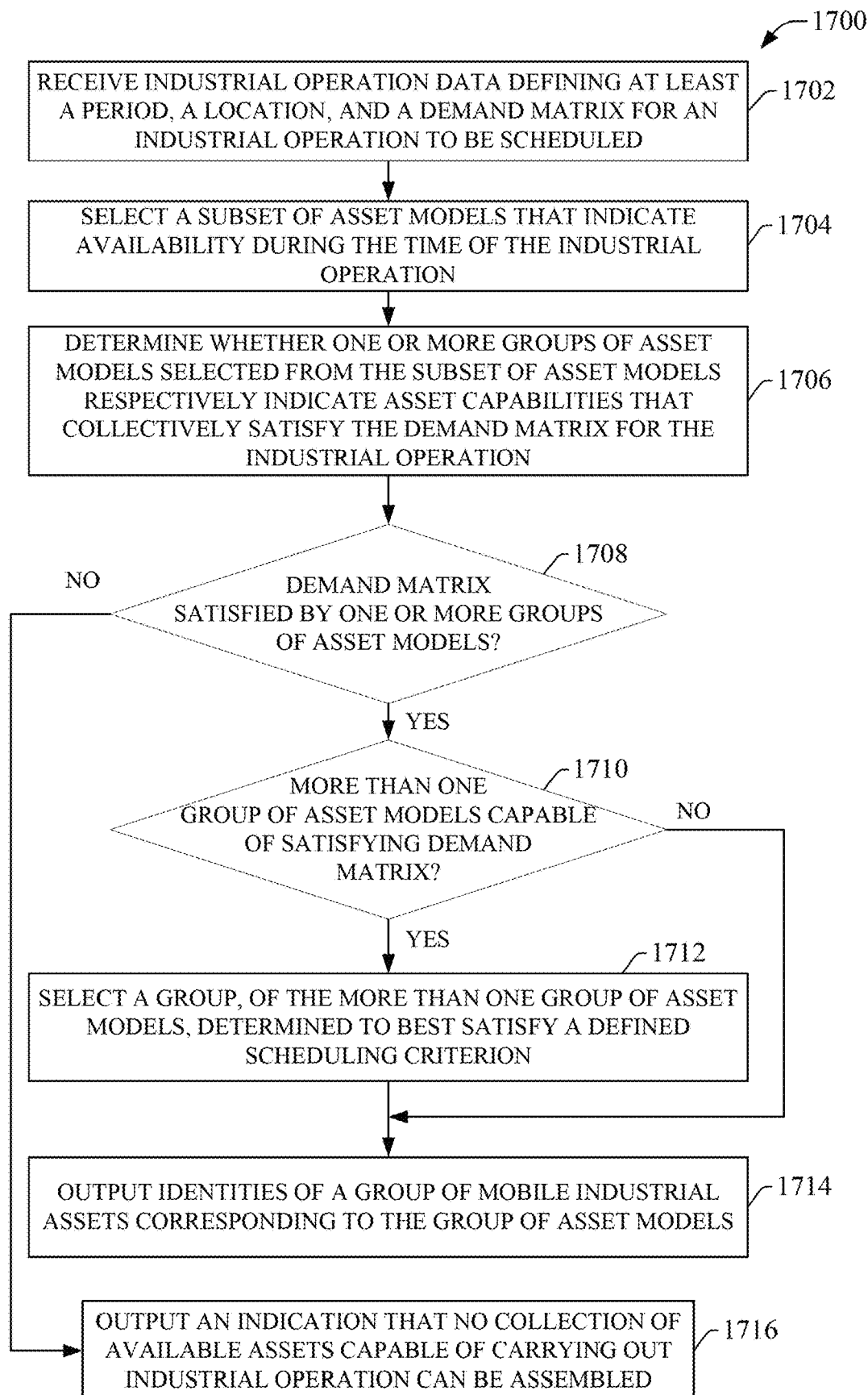
FIG. 17 is a flowchart of an example methodology for dynamically assigning groups of mobile industrial assets to a scheduled industrial operation.

FIG. 17 illustrates an example methodology 1700 for dynamically assigning groups of mobile industrial assets to a scheduled industrial operation. Methodology 1700 can be carried out, for example, by embodiments of mobile asset management system 202.

Initially, at 1702, industrial operation data is received, the industrial operation data defining at least a period, a location, and a demand matrix for an industrial operation to be scheduled. The industrial operation can be, for example, a fracking operation or another industrial operation that utilized mobile industrial assets. The period can define a scheduled time period for the industrial operation, the location can specify a particular work site (e.g., a fracking station) at which the industrial operation will be carried out, and the demand matrix can specify one or more functional demands that require the use of mobile industrial assets (e.g., pumping trucks, blenders, etc.).

At 1704, a subset of asset models that indicate availability during the time of the industrial operation are selected. The subset of asset models can be selected from a library of asset models corresponding to respective mobile industrial assets owned by an industrial enterprise. The asset models can define both fixed properties of the assets (e.g., asset type, asset capability, telemetry data points that are available for monitoring, etc.) and variable properties of the assets (e.g., a current status, remaining work hours until the next schedule maintenance, accumulated work hours, current location, predicted work schedule, etc.). In some embodiments, the asset models can be updated by the mobile asset management system 202 using methodology 1600 described above.

At 1706, a determination is made as to whether one or more groups of asset models selected from the subset of asset models obtained at step 1704 respectively indicate asset capabilities that collectively satisfy the demand matrix for the industrial operation (as specified by the industrial operation data received at step 1702). If it is determined that the no groups of asset models drawn from the subset of asset models can be clustered in a manner that satisfies the demand matrix (NO at step 1708), the methodology proceeds to step 1716, where an indication is output specifying that no collection of mobile assets that are expected to be available during the operation period are capable of collectively satisfying the demand matrix. Alternatively, if one or more groups of available asset models are determined to be capable of collectively satisfying the demand matrix (YES at step 1708), the methodology proceeds to step 1710, where a determination is made as to whether more than one group of asset models—drawn from the subset of asset models obtained at step 1704—are capable of satisfying the demand matrix.

If it is determined that not more than one group of asset models are capable of satisfying the demand matrix (NO at step 1710), the methodology proceeds to step 1714, where identities of the mobile industrial assets corresponding to the sole eligible group of mobile assets are output. The identities of the group of assets can be output as a visual rendering on a graphical user interface, or can be output to an automatic asset scheduling system to facilitate scheduling the assets for the industrial operation.

Alternatively, if it is determined that more than one group of asset models drawn from the subset are capable of satisfying the demand (YES at step 1710), a group is selected from the more than one group of eligible asset models, where the group is selected based on a defined scheduling criterion. In one or more embodiments, the scheduling criterion can be defined as stored scheduling policy data (e.g., scheduling policy data 902). Example scheduling criteria include, but are not limited to, a requirement to minimize the total number of mobile assets deployed to the work site, to minimize total operating costs or energy consumption, to maximize efficiency in terms of operating cost per product output, or other such criteria. Also, in some embodiments, if operating metrics for the respective groups of assets are available (e.g., as asset group profiles 908 for the respective groups), selection of the optimal group can be determined based on part on a comparison of the metrics across the groups. Once a selection is made at step 1712, the methodology proceeds to step 1714, where the identities of the assets comprising the selected group are output.

Figure 18:
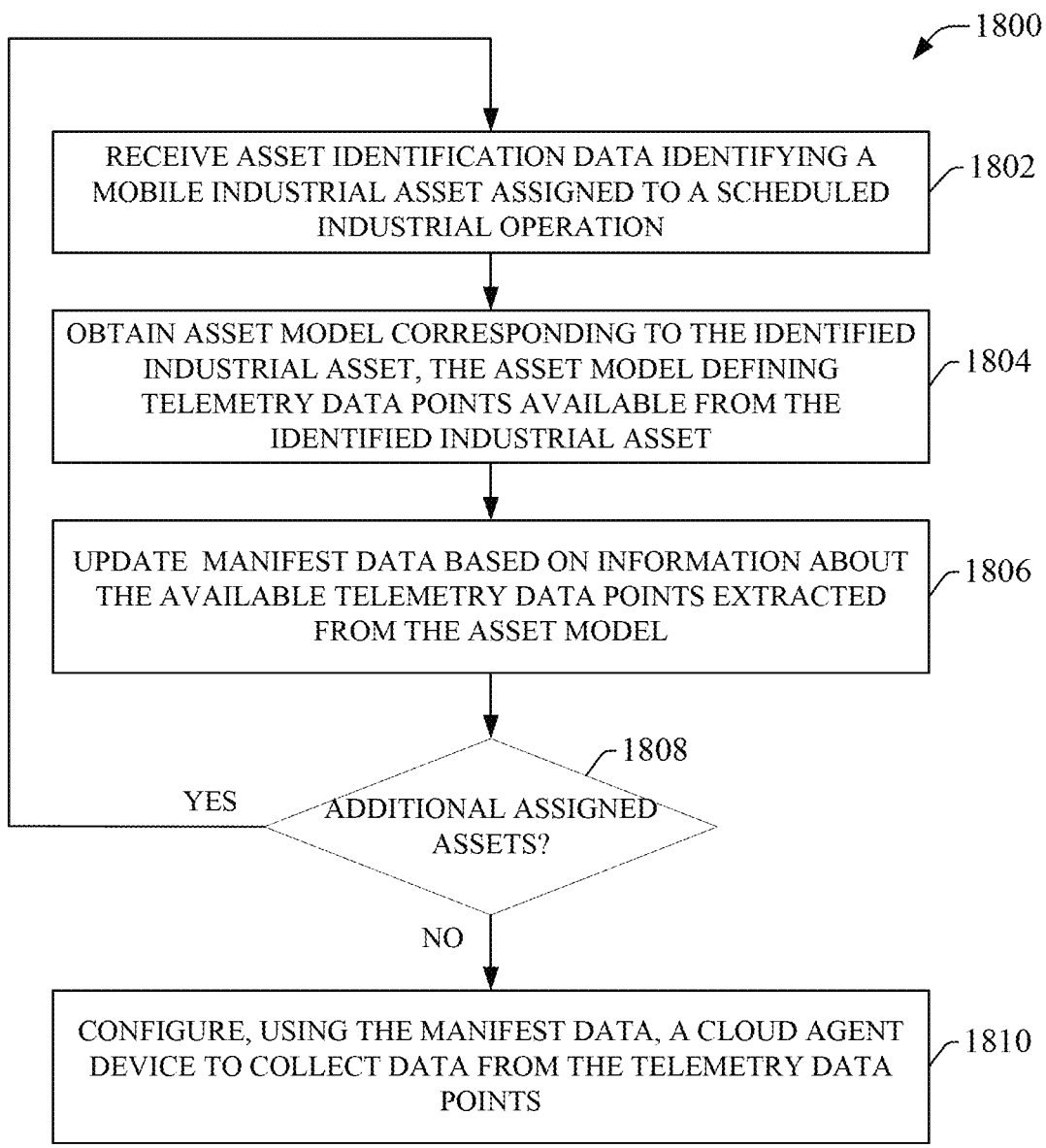
FIG. 18 is a flowchart of an example methodology for dynamically configuring a cloud agent device to collect telemetry and status data from mobile assets assigned to an industrial operation.

FIG. 18 illustrates an example methodology 1800 for dynamically configuring a cloud agent device to collect telemetry and status data from mobile assets assigned to an industrial operation (e.g., a fracking operation, a mining operation, a power distribution operation, etc.). Initially, at 1802, asset identification data is received, the asset identification data identifying a mobile industrial asset assigned to a scheduled industrial operation. In some embodiments, the asset identification data can be an output generated as a result of executing methodology 1700 described above (e.g., as data generate by step 1714). In other example embodiments, the asset identification data can be generated as a result of the mobile industrial asset performing a registration operation at the work site at which the industrial operation will be carried out. According to this registration operation, the mobile industrial asset may send asset identification data to an asset subscription point device (e.g., asset subscription point device 1208), where the asset identification data includes an identifier of the asset.

At 1804, an asset model corresponding to the identified industrial asset is obtained based on the asset identification data received at step 1800. The asset model defines telemetry data points that are available from the identified industrial asset, including information defining a data path to the data points (e.g., data tag names and locations), which can be used by a cloud agent device to communicatively connect to the data points. The asset model can also define other information for the identified industrial asset, including preferred communication parameters for the data points (e.g., a data collection update frequency), a remaining maintenance lifespan for the asset, a current status of the asset, or other such information.

At 1806, manifest data is updated based on information about the available telemetry data points extracted from the asset models. This can include adding the defined data point identifiers, data path information, and communication parameters or preferences to the manifest data. At 1808, a determination is made as to whether additional mobile industrial assets have been assigned to the industrial operation. If additional assets have been assigned to the operation (YES at step 1808), the methodology returns to step 1802, and steps 1802-1806 are repeated for the next assigned mobile asset. Steps 1802-1806 are repeated for all mobile industrial assets that have been assigned to the industrial operation, with the manifest data being updated for each assigned asset.

When there are no further assets to be assigned to the industrial operation (NO at step 1808), the methodology proceeds to step 1810, where the manifest data is used to configure a cloud agent device to collect data from the telemetry data points identified by the asset models obtained at each iteration of step 1804.

Figure 19:
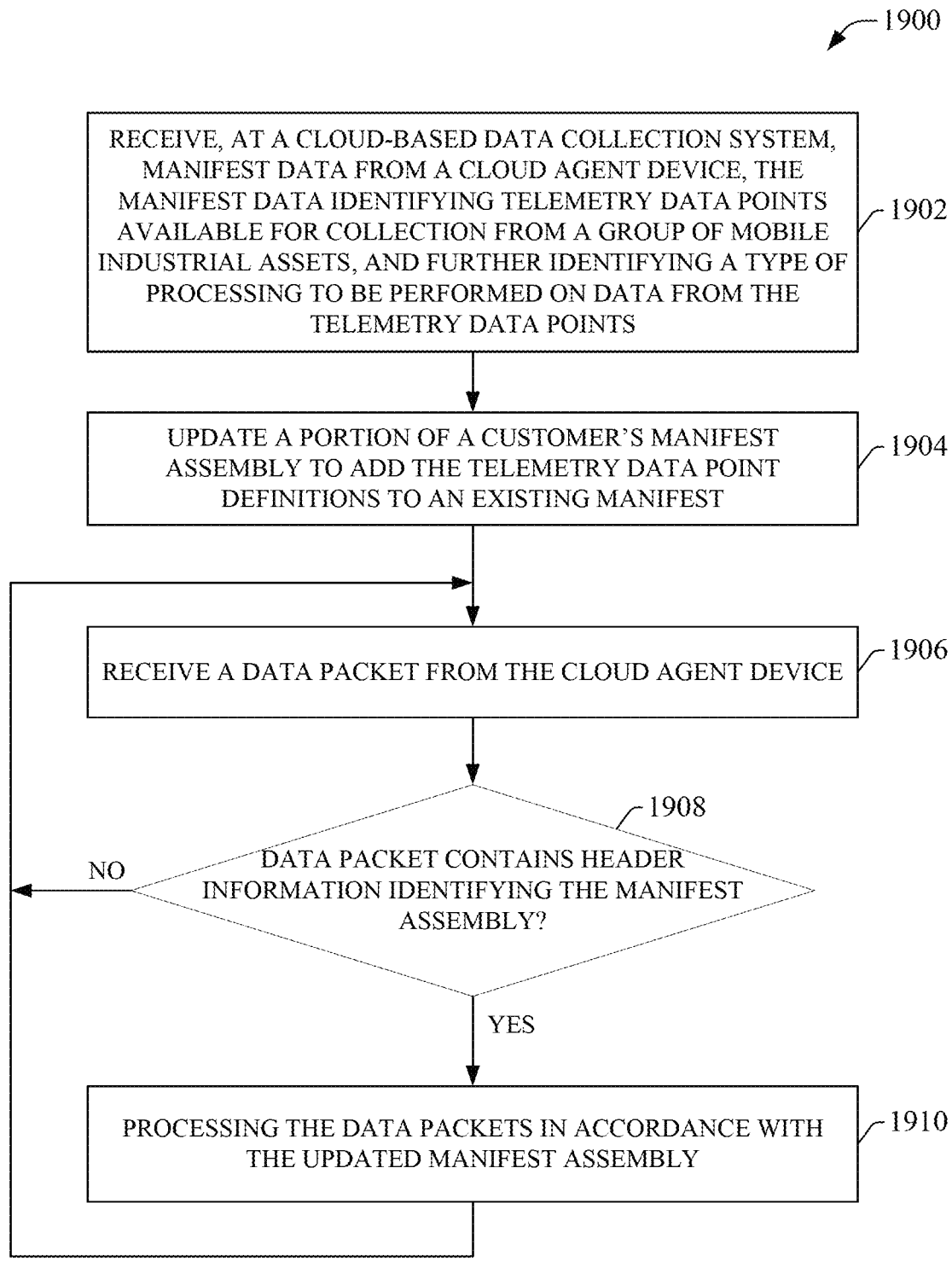
FIG. 19 is a flowchart of an example methodology for remotely updating a customer's manifest assembly on a cloud-based industrial data collection system.

FIG. 19 illustrates an example methodology 1900 for remotely updating a customer's manifest assembly on a cloud-based industrial data collection system. Initially, at 1902, manifest data is received at a cloud-based data collection system from a cloud agent device (e.g., a cloud agent device located on-premise at an industrial facility or work site). The manifest data identifies telemetry data points available for collection from a group of mobile industrial assets, as well as a type of processing to be performed on data from the telemetry data points. At 1904, based on information contained in the manifest data received at step 1902, a portion of the customer's manifest assembly associated with the industrial data collection system is updated to add the telemetry data point definitions to an existing manifest.

At 1906, a data packet is received from the cloud agent device. At 1908, a determination is made as to whether the data packet contains header information identifying the manifest assembly. If the data packet does not contain such header information (NO at step 1908), the methodology returns to step 1906, and data packets continue to be received at the data collection system. Alternatively, if the data packet contains header information identifying the manifest assembly (YES at step 1908), the methodology proceeds to step 1910, where the data packet is process in accordance with the updated manifest assembly.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
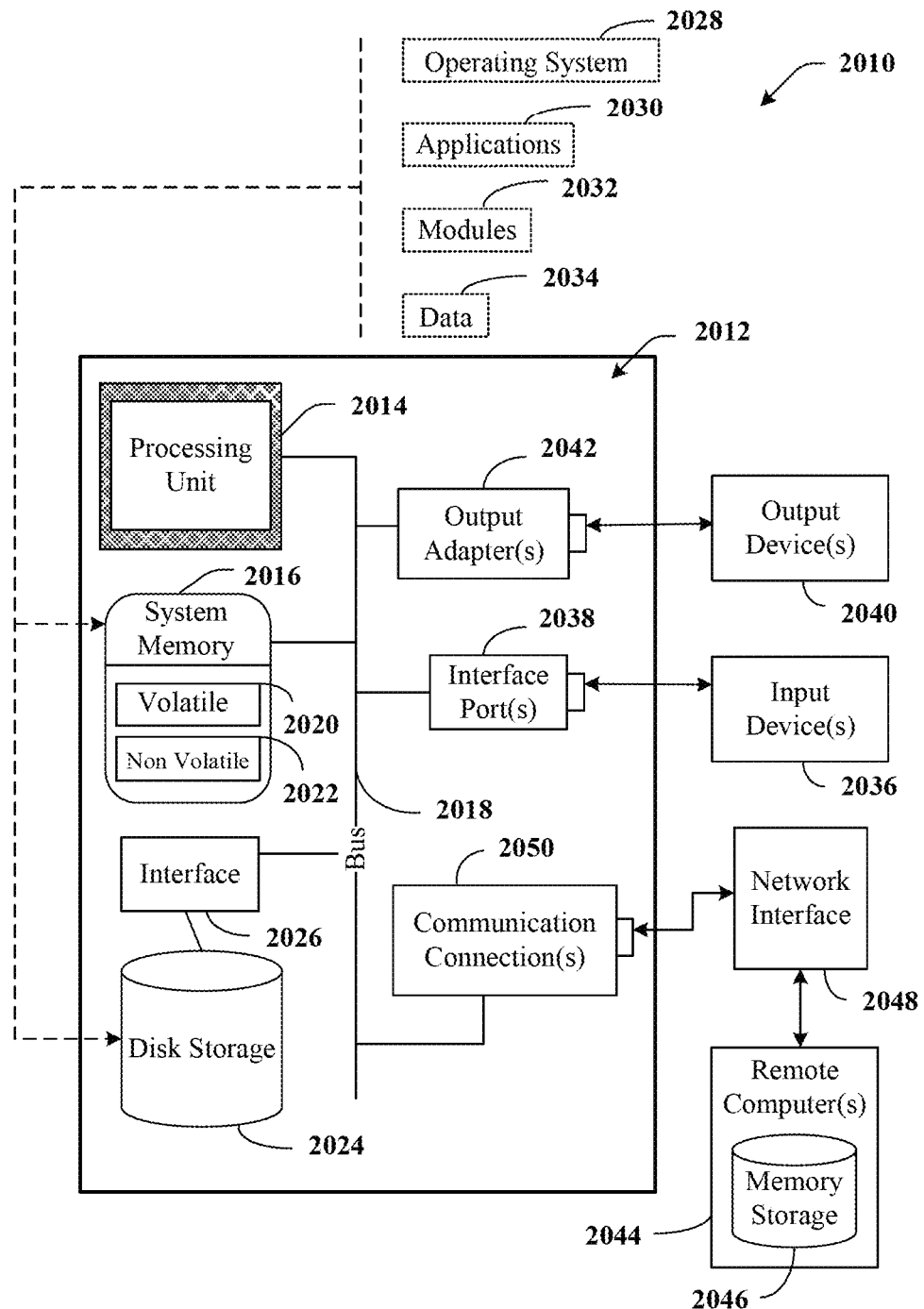
FIG. 20 is an example computing environment.
Figure 21:
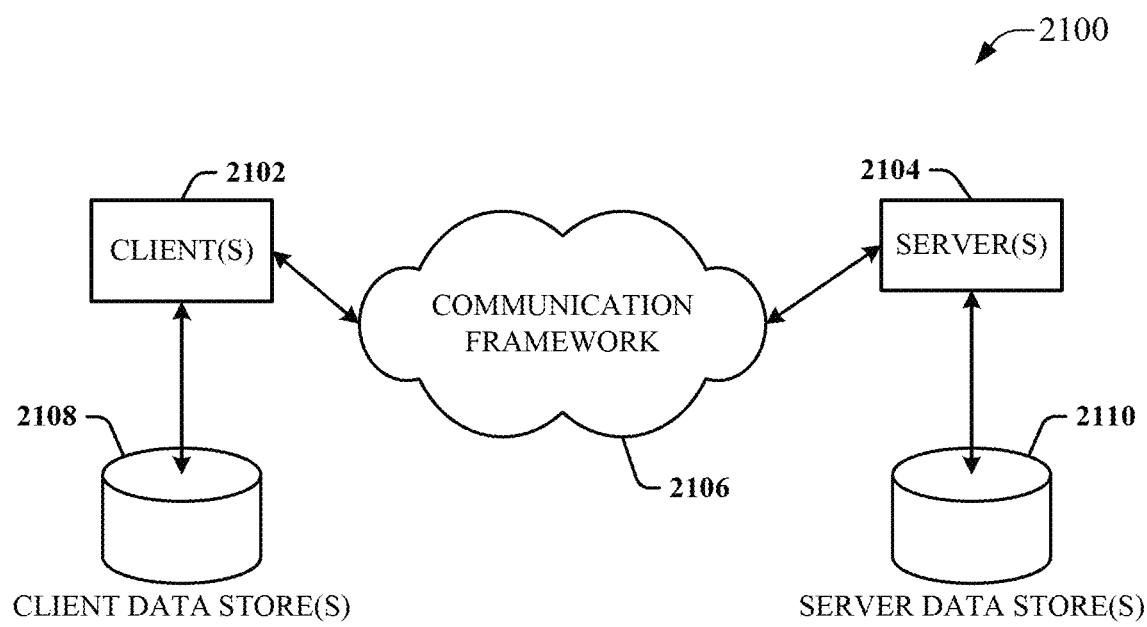
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented.

With reference to FIG. 20, an example environment 2010 for implementing various aspects of the aforementioned subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Multicore microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable PROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/non-removable, volatile/nonvolatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer 2012. System applications 2030 take advantage of the management of resources by operating system 2028 through program modules 2032 and program data 2034 stored either in system memory 2016 or on disk storage 2024. It is to be appreciated that one or more embodiments of the subject disclosure can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapters 2042 are provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the system bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2310 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for managing mobile industrial assets, comprising:
a memory that stores executable components; and
a processor, operatively coupled to the memory, that executes the executable components, the executable components comprising:
an asset model definition component configured to generate asset models corresponding to respective mobile industrial assets associated with at least one of a fracking station, a mining station, or a power plant, the asset models defining an asset type, an asset capability, and an availability schedule of the respective mobile industrial assets, wherein the mobile industrial assets comprises at least one of one or more truck-mounted industrial systems, one or more mobile power generators, or one or more mobile cooling systems;
an analysis component configured to
generate, based on analysis of collected performance data for an industrial asset of the mobile industrial assets, a future trend of a health parameter of the industrial asset as a function of time, wherein the health parameter is at least one of a vibration frequency, an operating temperature, a flow rate, a coolant level, a coolant temperature, or a noise level, wherein generating the future trend of the health parameter comprises:
comparing a trajectory of the collected performance data with one or more expected trajectories of measured data over a maintenance cycle for the industrial asset; and
determining where the collected performance data of the industrial asset corresponds to the one or more expected trajectories based on the comparison;
predict a time at which the industrial asset will require maintenance based on the future trend, and
modify the availability schedule for the industrial asset to indicate the time at which the industrial asset will require maintenance to yield a modified availability schedule; and
an asset scheduling component configured to,
in response to receipt of industrial operation data defining functional demands of a scheduled industrial operation, select a subset of the asset models defining respective asset types and asset capabilities that collectively satisfy the functional demands defined by the industrial operation data and whose modified availability schedules indicate availability during a duration of the schedule industrial operation, and configure, using asset scheduling data generated based on the subset of the asset models, a cloud agent device to collect telemetry data from a subset of the mobile industrial assets corresponding to the subset of the asset models.

2. The system of claim 1, wherein the subset of the asset models further comprises telemetry data point information defining telemetry data points that are available for collection from the subset of the mobile industrial assets, and the asset scheduling component is configured to generate the asset scheduling data to include the telemetry data point information.

3. The system of claim 2, wherein the asset scheduling data is configured to yield manifest data in response to processing by the cloud agent device, wherein the manifest data configures the cloud agent device to collect the telemetry data from the telemetry data points defined by the telemetry data.

4. The system of claim 2, wherein the executable components further comprise:

a queue management component configured to receive a data packet from the cloud agent device and assign industrial data from a mobile industrial asset, of the subset of the mobile industrial assets, contained in the data packet to a priority queue in a cloud platform; and a worker role component configured to identify, based on header information contained in the data packet, manifest assembly data that defines processing operations associated with the priority queue, and to perform the processing operations on the industrial data in accordance with the manifest assembly data.

5. The system of claim 4, wherein the executable components further comprise a manifest assembly component configured to update the manifest assembly data based on information contained in the subset of the asset models.

6. The system of claim 1, wherein the asset model definition component is configured to update information contained in an asset model, of the asset models, based on telemetry data collected from a mobile industrial asset corresponding to the asset model, and the information comprises at least one of a status of the mobile industrial asset, a number of work hours remaining until maintenance is required for the mobile industrial asset, an accumulated number of work hours logged for the mobile industrial asset, a current location of the mobile industrial asset, or a predicted work schedule of the mobile industrial asset.

7. The system of claim 1, wherein the asset scheduling component is further configured to, in response to a determination that multiple subsets of the asset models define respective asset types and asset capabilities that collectively satisfy the functional demands, select, as the subset of the asset models, one of the multiple subsets based on scheduling policy data defining an asset scheduling policy.

8. The system of claim 7, wherein the scheduling policy is a requirement to select the subset of the asset models corresponding to a group of mobile industrial assets estimated to at least one of consume a least amount of energy in connection with executing the scheduled industrial operation, execute the scheduled industrial operation in a least amount of time, execute the scheduled industrial operation at a lowest cost, execute the scheduled industrial operation at a highest efficiency, or execute the scheduled industrial operation using a smallest number of mobile industrial assets.

9. The system of claim 7, further comprising an asset profile metrics component configured to generate, based on data collected from different subsets of the mobile industrial assets during execution of industrial processes, asset group profile data that records respective performance metrics for the different subset of the mobile industrial assets.

10. The system of claim 9, wherein the scheduling policy is a requirement to select the subset of the asset models based on a comparison of the respective performance metrics recorded in the asset group profile data.

11. The system of claim 7, wherein the asset scheduling component is further configured to:

determine, based on historical telemetry data collected for mobile industrial assets corresponding to respective asset models of the multiple subsets of the asset models, individual performance metrics for the mobile industrial assets;

determine, based on the individual performance metrics and the industrial operation data, respective collective performance metrics for the multiple subsets of the asset models relative to execution of the scheduled industrial operation; and select, as the subset of the asset models, one of the mobile subsets of the asset models corresponding to one of the collective performance metrics that satisfies a defined criterion.

12. A method for scheduling and monitoring mobile industrial assets, comprising:

generating, by a system comprising a processor, asset models corresponding to respective mobile industrial assets, wherein the mobile industrial assets comprises at least one of one or more truck-mounted industrial systems, one or more mobile power generators, or one or more mobile cooling systems, wherein the asset models define an asset type, an asset capability, and an availability schedule of the respective mobile industrial assets;

generating, by the system based on analysis of collected performance data for an industrial asset of the mobile industrial assets, a future trend of a health parameter of the industrial asset as a function of time, wherein the health parameter is at least one of a vibration frequency, an operating temperature, a flow rate, a coolant level, a coolant temperature, or a noise level, wherein generating the future trend of the health parameter comprises:

comparing a trajectory of the collected performance data with one or more expected trajectories of measured data over a maintenance cycle for indicates predictions of near term and long term health of the industrial asset; and determining where the collected performance data of the industrial asset corresponds to the one or more expected trajectories based on the comparison;

predicting, by the system, a time at which the industrial asset will require maintenance based on the future trend;

modifying, by the system, the availability schedule for the industrial asset to indicate the time at which the industrial asset will require maintenance to yield a modified availability schedule;

selecting, by the system based on industrial operation data defining functional demands of a scheduled industrial operation, a subset of the asset models that define respective asset types and asset capabilities that collectively satisfy the functional demands defined by the industrial operation data and that have modified availability schedules indicating availability during a duration of the scheduled industrial operation; and configuring, by the system using asset scheduling data generated based on the subset of the asset models, a cloud agent device to collect telemetry data from a subset of the mobile industrial assets corresponding to the subset of the asset models.

13. The method of claim 12, further comprising generating, by the system, the asset scheduling data based on telemetry data point definitions defined in the subset of the asset models, the telemetry data point definitions defining telemetry data points that are available for collection from the subset of the mobile industrial assets.

14. The method of claim 13, further comprising generating, by the system based on information contained in the subset of the asset models, manifest data that configures the cloud agent device to collect the telemetry data from the telemetry data points defined by the telemetry data point definitions.

15. The method of claim 13, further comprising:
receiving, by the system, a data packet from the cloud agent device, the data packet comprising industrial data collected from a mobile industrial asset of the mobile industrial assets;
assigning, by the system, the industrial data to a priority queue in a cloud platform;
selecting, by the system, manifest assembly data based on header information contained in the data packet, the manifest assembly data defining an operation to be performed on data associated with the priority queue; and
processing, by the system, the industrial data in the priority queue in accordance with an operation defined by the manifest assembly data.

16. The method of claim 15, further comprising updating, by the system, the manifest assembly data based on information contained in the asset models.

17. The method of claim 12, further comprising:
collecting, by the system, telemetry data from a mobile industrial asset corresponding to an asset model of the asset models; and
updating, by the system, information contained in the asset model based on the telemetry data, wherein the information comprises at least one of a status of the mobile industrial asset, a number of work hours remaining until maintenance is required for the mobile industrial asset, an accumulated number of work hours logged for the mobile industrial asset, a current location of the mobile industrial asset, or a predicted work schedule of the mobile industrial asset.

18. The method of claim 12, wherein the selecting comprises:
in response to a determination that multiple subsets of the asset models define respective asset types and asset capabilities that collectively satisfy the functional demands, selecting, as the subset of the asset models, one of the multiple subsets based on scheduling policy data defining an asset scheduling policy.

19. A non-transitory computer-readable medium having stored thereon instructions that, in response to execution, cause a system comprising a processor to perform operations, the operations comprising:
generating asset models corresponding to respective mobile industrial assets, wherein the mobile industrial assets comprises at least one of one or more truck-mounted industrial systems, one or more mobile power generators, or one or more mobile cooling systems, wherein the asset models define an asset type, an asset capability, and an availability schedule of the respective mobile industrial assets;
generating, based on analysis of collected performance data for an industrial asset of the mobile industrial assets, a forecasted trend of a health parameter of the industrial asset as a function of time, wherein the health parameter is at least one of a vibration frequency, an operating temperature, a flow rate, a coolant level, a coolant temperature, or a noise level, wherein generating the future trend of the health parameter comprises:
comparing a trajectory of the collected performance data with one or more expected trajectories of measured data over a maintenance cycle for indicates predictions of near term and long term health of the industrial asset; and
determining where the collected performance data of the industrial asset corresponds to the one or more expected trajectories based on the comparison;
predicting, based on the forecasted trend, a time at which the industrial asset will require maintenance;
modifying the availability schedule for the industrial asset to indicate the time at which the industrial asset will require maintenance to yield a modified availability schedule;
selecting, based on industrial operation data defining functional demands of a scheduled industrial operation, a subset of the asset models that define respective asset types and asset capabilities that collectively satisfy the functional demands defined by the industrial operation data and that define modified availability schedules indicating availability during a duration of the scheduled industrial operation; and
configuring, using asset scheduling data generated based on the subset of the asset models, a cloud agent device to collect telemetry data from a subset of the mobile industrial assets corresponding to the subset of the asset models.

20. The non-transitory computer-readable medium of claim 19, the operations further comprising generating the asset scheduling data based on telemetry data point definitions defined in the subset of the asset models, the telemetry data point definitions defining telemetry data points that are available for collection from the subset of the mobile industrial assets.

* * * * *